United States Patent
Iwane

(10) Patent No.: US 10,848,732 B2
(45) Date of Patent: Nov. 24, 2020

(54) FREE VIEWPOINT MOVEMENT DISPLAY DEVICE

(71) Applicant: IWANE LABORATORIES, LTD., Sapporo (JP)

(72) Inventor: Waro Iwane, Sapporo (JP)

(73) Assignee: IWANE LABORATORIES, LTD., Sapporo (JP)

( * ) Notice: Subject to any disclaimer, the term of this patent is extended or adjusted under 35 U.S.C. 154(b) by 0 days.

(21) Appl. No.: 16/491,415

(22) PCT Filed: Feb. 27, 2018

(86) PCT No.: PCT/JP2018/007121
§ 371 (c)(1),
(2) Date: Sep. 5, 2019

(87) PCT Pub. No.: WO2018/163898
PCT Pub. Date: Sep. 13, 2018

(65) Prior Publication Data
US 2020/0036952 A1     Jan. 30, 2020

(30) Foreign Application Priority Data
Mar. 9, 2017   (JP) ................. 2017-045312

(51) Int. Cl.
*H04N 7/18*       (2006.01)
*H04N 13/111*     (2018.01)
(Continued)

(52) U.S. Cl.
CPC ............ *H04N 13/111* (2018.05); *G06T 7/248* (2017.01); *G06T 7/50* (2017.01); *G06T 7/62* (2017.01);
(Continued)

(58) Field of Classification Search
CPC ..................................................... H04N 13/111
(Continued)

(56) References Cited

U.S. PATENT DOCUMENTS

| | | | |
|---|---|---|---|
| 6,236,412 B1 | 5/2001 | Ojima | |
| 2002/0106135 A1* | 8/2002 | Iwane | G06T 7/74 382/305 |

(Continued)

FOREIGN PATENT DOCUMENTS

| | | | |
|---|---|---|---|
| JP | H07-287775 A | 10/1995 | |
| JP | H09-050540 A | 2/1997 | |

(Continued)

OTHER PUBLICATIONS

PCT/ISA/210, "International Search Report for International Application No. PCT/JP2018/007121," dated May 15, 2018.

*Primary Examiner* — Leron Beck
(74) *Attorney, Agent, or Firm* — Manabu Kanesaka

(57) ABSTRACT

In the invention, a CV (camera vector) video acquisition unit generates a CV video obtained by adding a CV value to a target video on which a CV calculation is performed to obtain the CV value representing three-dimensional coordinate values of a camera position and posture of the target video. A virtual three-dimensional space disposition unit disposes, in a virtual space, a plurality of CV-value-added CV videos in accordance with the three-dimensional coordinates. A viewpoint movement path image selection unit selects, from among the plurality of CV videos, a plurality of image frames closest to scheduled viewpoint movement coordinates in a suitable interval. A starting point/ending point continuous image display unit converts a viewpoint direction and a viewpoint movement direction of the plu-
(Continued)

rality of image frames to match a scheduled direction, and sequentially combines the plurality of image frames to generate a continuous image.

4 Claims, 27 Drawing Sheets

(51) Int. Cl.
  *G06T 7/62* (2017.01)
  *G06T 7/50* (2017.01)
  *G06T 7/73* (2017.01)
  *G06T 7/246* (2017.01)
  *H04N 13/156* (2018.01)
  *H04N 13/351* (2018.01)
  *H04N 5/262* (2006.01)

(52) U.S. Cl.
  CPC ............. *G06T 7/73* (2017.01); *H04N 5/2628* (2013.01); *H04N 13/156* (2018.05); *H04N 13/351* (2018.05); *G06T 2207/10016* (2013.01); *G06T 2207/30244* (2013.01)

(58) Field of Classification Search
  USPC .......................................................... 348/43
  See application file for complete search history.

(56) References Cited

U.S. PATENT DOCUMENTS

2008/0221843 A1* 9/2008 Shenkar ................. G06T 17/05
  703/1
2010/0061701 A1* 3/2010 Iwane .................... G06F 16/78
  386/241

FOREIGN PATENT DOCUMENTS

| | | |
|---|---|---|
| JP | H10-320590 A | 12/1998 |
| JP | H11-259673 A | 9/1999 |
| JP | 2001-202531 A | 7/2001 |
| JP | 2007-316839 A | 12/2007 |
| JP | 2012-118666 A | 6/2012 |

* cited by examiner (a)

(b)

(c)

(a)

(b)

(c)

Image 1

Correspondence point

Image 2

(a) Three-dimensional graph (b) Top view (c) Side view (a)

(b)

CV value display (a)

(b)

(a)

(b)

(a)

(b)

Frame f1 closest from position of viewpoint in elapsed time t1

○ Viewpoint
● Initial frame
● Objective frame
● Candidate of intermediate frame
✖ Target
---▶ Viewpoint movement direction
⟶ Viewpoint orientation (a)

| Intermediate frame | Change in apparent view angle |
|---|---|
| f0 | |
| f1 | |
| f2 | |
| f3 | |
| f4 | |
| f5 | |
| fn | |

FREE VIEWPOINT MOVEMENT DISPLAY DEVICE

RELATED APPLICATIONS

The present application is National Phase of International Application No. PCT/JP2018/007121 filed Feb. 27, 2018, and claims priority from Japanese Application No. 2017-045312, filed Mar. 9, 2017, the disclosure of which is hereby incorporated by reference herein in its entirety.

TECHNICAL FIELD

The invention relates to an image and video processing technology which faithfully represents, without using CG, an image or a video from a free viewpoint only with a plurality of images and videos acquired by a still image camera, a video camera or the like.

BACKGROUND ART

Under a current situation, as a technique for displaying an image from a free viewpoint, computer graphics (CG) is available, and particularly three-dimensional CG (3DCG) is known as the only technique.

Further, so as to enable viewpoint movement simply and in a pseudo manner, such an art is available as a method for creating schematic CG, and pasting the image to the CG to display the image from the free viewpoint in the pseudo manner.

This method is a technique of once creating the schematic CG and pasting the image to the CG as a texture to display the image from an arbitrary viewpoint direction so as to view the image from the free viewpoint, as described in JP-B-4272966 according to the applicant of the invention.

For example, Google Street View, Google Earth or the like uses this technique.

Thus, as a technology for pasting the image to the CG, a technique of synthesizing 3DCG generated from the image or directly generated by a computer with a video picked up by an ordinal camera is known, for example.

A 3DCG synthesis technology of this kind is an art of synthesizing a real video image picked up by a moving camera such as a vehicle-mounted camera or a camera held by a photographer with the 3DCG, and is used in the field of video representation such as television broadcasting, a movie and a computer game (for example, see Patent Documents 1 to 4).

RELATED ART DOCUMENTS

Patent Documents

Patent Document 1: JP-A-H07-287775
Patent Document 2: JP-A-H09-050540
Patent Document 3: JP-A-H10-320590
Patent Document 4: JP-A-2001-202531

SUMMARY OF THE INVENTION

Problems to be Solved by the Invention

However, according to pseudo free viewpoint display using CG, including the 3DCG synthesis technology as described above, if the CG is exquisite, a free viewpoint with high precision corresponding thereto can be obtained, but if the CG is coarse, an image is significantly distorted depending on a viewpoint, and non-smoothness cannot be wholly hidden.

For example, if the viewpoint from which the image is displayed is moved by pasting the image picked up from a predetermined viewpoint created from the image on a road to schematic CG, only when the image is displayed so as to be viewed from the same viewpoint as the image pasted, accurate viewpoint display is obtained. However, when the image from any other viewpoint is displayed, the display is gradually distorted, and the image is displayed in such a manner that a utility pole is bent, for example.

More specifically, in order to create an accurate viewpoint, there is no other way than thoroughly creating the CG having the same shape as reality. However, such operation is already creation of the CG itself, which is the CG itself obtained by pasting the image as a texture.

The CG thoroughly created so as to be equated with the reality is different from a real world, as long as the product is the CG, even if the CG is thoroughly created, and the problems as described below occur.

1. An object existing in reality is not always displayed in the CG, and an object displayed in the CG does not always exist in reality; further, 2. an object not displayed in the CG does not always exist in reality, and an object not existing in reality is not always displayed in the CG.

More specifically, even if the CG is created in any exquisite manner in principle, the CG includes omission of information and addition of erroneous information from video information faithfully reflecting an original real world.

An important aspect herein is that the CG inevitably includes the omission of information and the addition of erroneous information in principle. On the other hand, an image or a video obtained by taking up the reality by a camera has neither the omission nor the addition.

The invention has been proposed in order to solve the problems of the conventional technology as described above, and an object of the invention is to provide a free viewpoint movement display device in which a plurality of image data are disposed, without using CG at all, in a virtual space to sequentially display images, while selecting the closest image according to viewpoint movement, thereby moving a viewpoint while combining, without using the CG, intermediates therebetween by enlargement and reduction of the image and viewpoint direction movement thereof, whereby continuous viewpoint movement without distortion specific to the CG can be achieved.

Means for Solving the Problems

In order to achieve the above-described object, a free viewpoint movement display device of the invention is configured in such a manner that the free viewpoint movement display device is provided with: a camera vector (CV) video acquisition means which generates a CV video obtained by adding a CV value to a target video on which a CV calculation is performed to obtain the CV (camera vector: a value representing, by 6 variables, a camera position and posture in which an image is acquired) value representing three-dimensional coordinate values of the camera position and posture of the target video picked up by a predetermined video acquisition means; a virtual three-dimensional space disposition means which disposes, in a virtual space, a plurality of CV videos obtained by adding the CV values representing the three-dimensional coordinate values of the camera position and posture, in accordance with the three-dimensional coordinates; a viewpoint movement path selection means which selects, from among the plurality of CV videos, a plurality of image frames closest to scheduled viewpoint movement coordinates in a suitable interval according to the scheduled viewpoint movement coordinates; and a continuous image generation means which converts a viewpoint direction, an enlargement ratio, a view angle and a viewpoint movement direction and the like of the plurality of image frames selected so as to match a scheduled direction, and sequentially combines the image frames selected to generate a continuous image formed of a video image or a continuous still image, wherein an image of visually smooth viewpoint movement and smooth viewpoint direction movement is displayed by using the continuous image.

Advantageous Effects of the Invention

According to a free viewpoint movement display device of the invention, a plurality of image data are disposed, without using CG at all, in a virtual space to sequentially display the images while selecting the closest image according to viewpoint movement, whereby a viewpoint can be moved while combining, without using the CG, intermediates therebetween by enlargement and reduction of the images and viewpoint direction movement thereof.

Accordingly, continuous viewpoint movement without distortion which has been unavoidable in the CG can be achieved, and a video of smooth viewpoint movement can be reproduced, and even if the image is displayed as a still image by stopping the video at any position of the image, the still image without distortion can be displayed without causing omission of information as in the CG.

BRIEF DESCRIPTION OF THE DRAWINGS

FIGS. 3(a) and 3(b) are schematic diagrams showing a means which picks up the full circumference video image used in the CV calculation means shown in FIG. 1, in which FIG. 3(a) is a front view of the vehicle mounted with the full circumference camera in the roof part, and FIG. 3(b) is a plan view of the same.

FIGS. 4(a), 4(b) and 4(c) are explanatory diagrams showing a conversion image obtained from a video picked up by a full circumference camera, in which FIG. 4(a) shows a virtual spherical surface to which a spherical image is pasted, FIG. 4(b) shows one example of the spherical image pasted to the virtual spherical surface, and FIG. 4(c) shows an image obtained by performing planar development of the spherical image shown in FIG. 4(b) according to the Mercator projection.

FIGS. 17(a) and 17(b) are explanatory diagrams schematically showing a relationship between a target video and CV values of the target video in a free viewpoint movement display device according to one embodiment of the invention, in which FIG. 17(a) shows one example of the target video, and FIG. 17(b) shows the CV values corresponding to the target video shown in FIG. 17(a).

FIGS. 23(a) and 23(b) are explanatory diagrams describing operation of blending processing of intermediate frame images based on CV values in a free viewpoint movement display device according to one embodiment of the invention, in which FIG. 23(a) shows one example of a target video on which the blending processing is performed, and FIG. 23(b) is a graph showing a relationship between a blending ratio of the two intermediate frame images shown in FIG. 23(a) on which the blending processing is performed and a distance from a viewpoint to an objective frame.

FIG. 25 is an explanatory diagram showing one example of a change in a view angle of each intermediate frame image acquired during animation by a plurality of frame images according to one embodiment of the invention.

MODE FOR CARRYING OUT THE INVENTION

Figure 1:
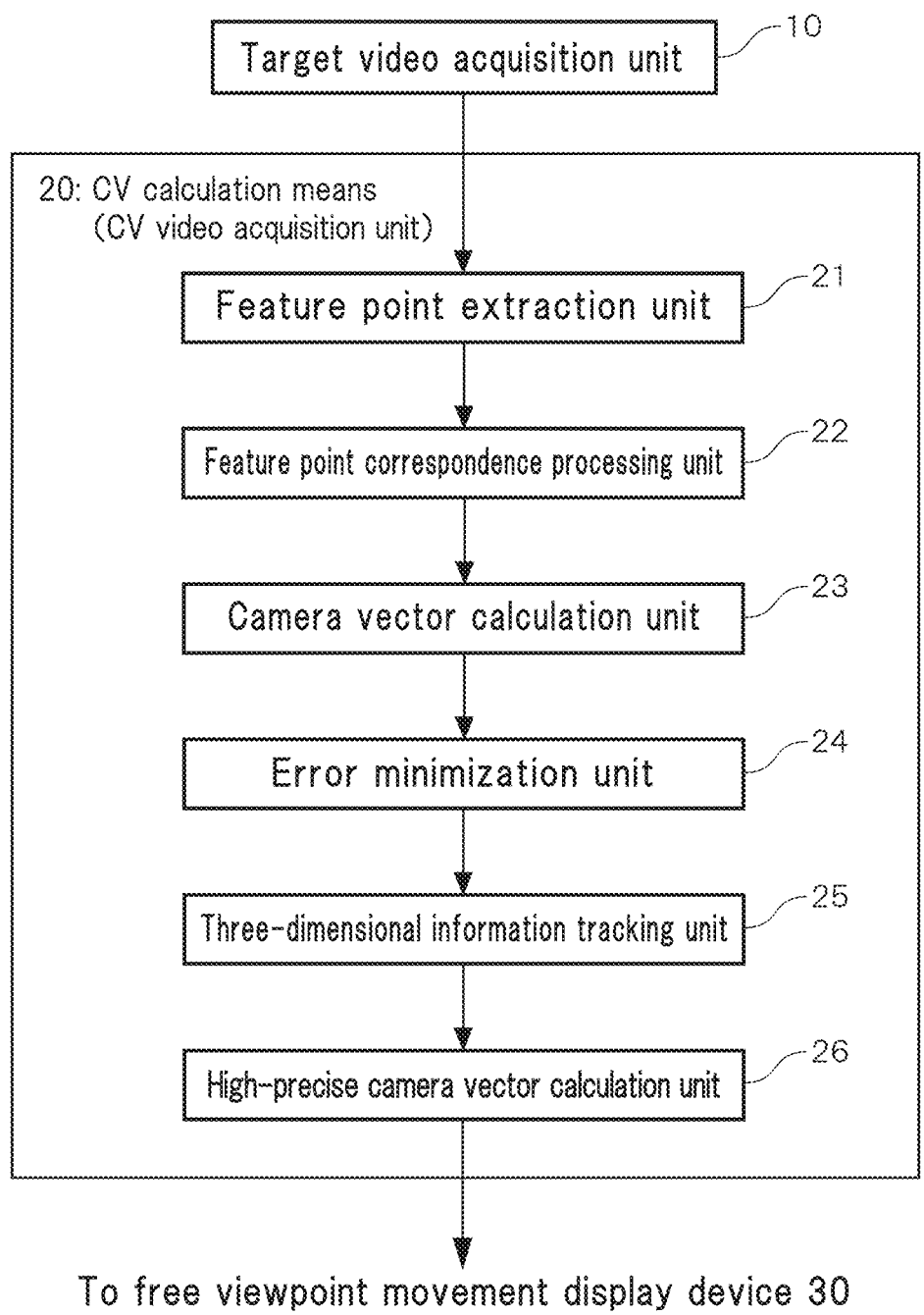
FIG. 1 is a block diagram showing a basic configuration of one embodiment of a CV calculation means (CV video acquisition unit) which performs a CV calculation of a target video in a free viewpoint movement display device of the invention.

Hereinafter, a preferable embodiment of a free viewpoint movement display device according to the invention will be described with reference to drawings.

Here, the free viewpoint movement display device of the invention described below is realized by processing, a means or a function executed by a computer by an instruction of a program (software). The program transmits a command to each component to allow the component to perform predetermined processing or function as described below, for example, automatic extraction of feature points (reference points) serving as a reference or other feature points in a target video, automatic tracking of the reference points extracted, a calculation of three-dimensional coordinates of the reference points, a calculation of a camera vector (CV) value, disposition of a plurality of CV videos in a virtual three-dimensional space, selection of an optimum image frame from among the plurality of CV videos, conversion of viewpoint directions and viewpoint movement directions of a plurality of image frames, combination of the image frames selected, or the like. Thus, each processing or means in the invention is realized by a specific means in which the program coordinates with the computer.

In addition, the program is wholly or partly provided by a magnetic disc, an optical disc, a semiconductor memory or any other arbitrary computer readable storage medium, for example, and the program read from the storage medium is installed to the computer and executed.

Further, the program can also be directly loaded to the computer through a communication line without passing through the storage medium, and executed.

Further, the computer may be configured of one PC or the like, for example, or can be configured of a plurality of server computers or the like.

[CV Video]

The free viewpoint movement display device according to one embodiment of the invention described below is a means in which an arbitrary point or target in a video is specified and selected in the target video picked up and acquired by a video camera, for example, thereby selecting an optimum path over a plurality of frame images to move a viewpoint toward the point and target specified for enabling to reproduce the target video as a video (continuous image) by the smooth viewpoint movement without distortion as in CG.

Then, the free viewpoint movement display device according to the present embodiment is provided on the premise that a camera vector (CV) video obtained by providing the target video with information of 6 variables in total, including predetermined three-dimensional coordinates and postures, is used for realizing the free viewpoint movement display as described above.

In addition, 6 variables equivalent to the variables described above can also be acquired by a mechanical sensor (IMU and Gyro, or the like) attached to a camera, for example. However, the variables can be generated and acquired by a CV calculation with higher precision, at lower cost and in a simpler manner.

Hereinafter, the CV video used in the free viewpoint movement display according to the invention will be described.

On the premise of performing the free viewpoint movement display, an image pick-up camera for acquiring and picking up the target video serving as a target and object of viewpoint movement is installed to a mobile body such as a vehicle to acquire a video image or a continuous still image. Then, the feature points are extracted in each frame image of the target video acquired, or the like, to determine camera positions and postures in all frames by a mathematical calculation.

Specifically, the camera position and posture are represented by 6 variables, specifically, a vector (camera vector: CV) having 6 degrees of freedom, including position coordinates (X, Y, Z) of the camera and rotation angles ($\phi$x, $\phi$y, $\phi$z) of respective coordinate axes, to correspond the vector to each frame of the video in a one-to-one manner, whereby the CV video can be generated (see FIGS. 1 to 13 described later).

This CV video is used, whereby the free viewpoint movement display can be performed in an arbitrary video without using CG such as an existing image synthesis technology.

Here, the term "6 variables representing an objective camera position and posture" means 6 kinds of variables in total, including coordinates (X, Y, Z) and postures ($\phi$x, $\phi$y, $\phi$z).

More specifically, the free viewpoint movement device according to the present embodiment acquires the 6 variables representing the position and the posture of an arbitrary point and target included in the target video. The expression "acquires the 6 variables" means determination of the 6 variables of (X, Y, Z) indicating three-dimensional position coordinates and ($\phi$x, $\phi$y, $\phi$z) indicating the postures, as described above.

A video provided with such a CV value indicating the 6 variables of the positions and the postures is the CV video. The CV value can also be acquired from a continuous image by the calculation (JP-B-4446041), but can also be directly acquired from IMU, Gyro or the like, for example.

Definition of Terms

Next, definitions of terms and phrases used in the present description and the scope of claims will be described.

CV Value/CV Video/CV Image:

Then, 6 variables obtained by a mechanical sensor loaded on a moving object (for example, a vehicle, a robot or the like), and 6 variables obtained by calculating a camera position and posture from a continuous still image or a video image obtained from a camera are referred to as a camera vector (CV), a value thereof is referred to as a CV value, determination of the CV value by the calculation is referred to as a CV calculation, and an image having such a CV value is referred to as a CV video.

In addition, 6 valuables obtained from a mechanical sensor integrated with the camera can also be applied as the CV value according to the invention.

Further, a non-continuous and independent image is referred to as a CV image in several cases. Alternatively, in focusing only on one frame, the image of the one frame is referred to as the CV image in several cases. More specifically, the CV image is a special state (independent image) of the CV video.

Viewpoint Movement/Viewpoint Direction Movement:

In the invention, the term "viewpoint movement" means freely changing viewpoint places and viewpoint directions in the arbitrary video (the target video, the CV video, and the continuous image) to display the arbitrary video.

Meanwhile, the term "viewpoint direction movement" means changing only the viewpoint directions, while fixing the place, in the arbitrary video.

The viewpoint movement/viewpoint direction movement described above will be described in detail with reference to FIGS. 14 to 25 described later.

[CV Calculation]

Next, a detail of the CV calculation for generating the CV video to be used in the free viewpoint movement display device of the invention as described above will be described with reference to FIGS. 1 to 13.

The term "CV calculation" means determination of the CV value, and the results determined are referred to as the CV value or CV data. The expression "CV" means an abbreviation of "Camera Vector," and the term "camera vector (CV)" means a value indicating a three-dimensional position and a 3-axis rotation posture of the camera such as the video camera for acquiring the video for measurement or the like.

According to the CV calculation, the image of the video (video image) is acquired to detect the feature points in the video to track the feature points in a plurality of adjacent frames to generate a great number of triangles formed by camera positions and tracking loci of the feature points in the image to analyze the triangles, thereby determining the three-dimensional camera position and the 3-axis rotation camera posture.

In the CV calculation, it is important characteristics that the three-dimensional coordinates are simultaneously determined also on the feature points (reference points) in the video in a process of determining the CV value.

Further, in the CV value determined from the video image by the calculation, the three-dimensional camera position and the three-dimensional camera posture are simultaneously determined in corresponding to each frame of the video image. Furthermore, characteristics in which the CV value is determined in corresponding to the video by one camera are excellent features which can be realized only by the CV calculation in principle.

For example, according to a measurement means (GPS, IMU or the like) by other methods, in order to simultaneously acquire each frame of the video image, and the three-dimensional camera position and the three-dimensional camera posture, the image frame and a measurement sampling time should be synchronized with each other with high precision and completely, and therefore such a measurement means results in a significantly expensive device, which is substantially difficult to be realized.

The CV data determined from the video image by the calculation represents a relative value in an unprocessed stage, but in a short section, three-dimensional position information and 3-axis rotation angle information can be acquired with high precision.

Further, the CV data is acquired from the image, and therefore the data acquired represents the relative value, but has excellent characteristics in which a positional relationship with an arbitrary target in the image can be measured, which fails to be realized by other methods.

Further, the CV value in corresponding to the image is determined, and therefore the CV calculation which can directly determine the camera position and the 3-axis rotation posture from the image in measurement or survey in the image becomes preferable for the measurement in the image or the survey in the image.

Then, the free viewpoint movement display device of the invention performs, based on the video (CV video) provided with the CV data obtained from this CV calculation, viewpoint movement processing for the arbitrary point and target in the video.

[CV Calculation Means]

The CV calculation is performed in a CV calculation means 20 which functions as a CV video acquisition unit 20 (see FIG. 14) of the free viewpoint movement display device of the invention described later.

As shown in FIG. 1, the CV calculation means (CV video acquisition unit) 20 is configured to perform predetermined CV calculation processing on the video image input from a target video acquisition unit 10 configured of a vehicle-mounted video camera or the like. Specifically, the CV calculation means 20 has a feature point extraction unit 21, a feature point correspondence processing unit 22, a camera vector calculation unit 23, an error minimization unit 24, a three-dimensional information tracking unit 25 and a high-precision camera vector calculation unit 26.

Figure 2:
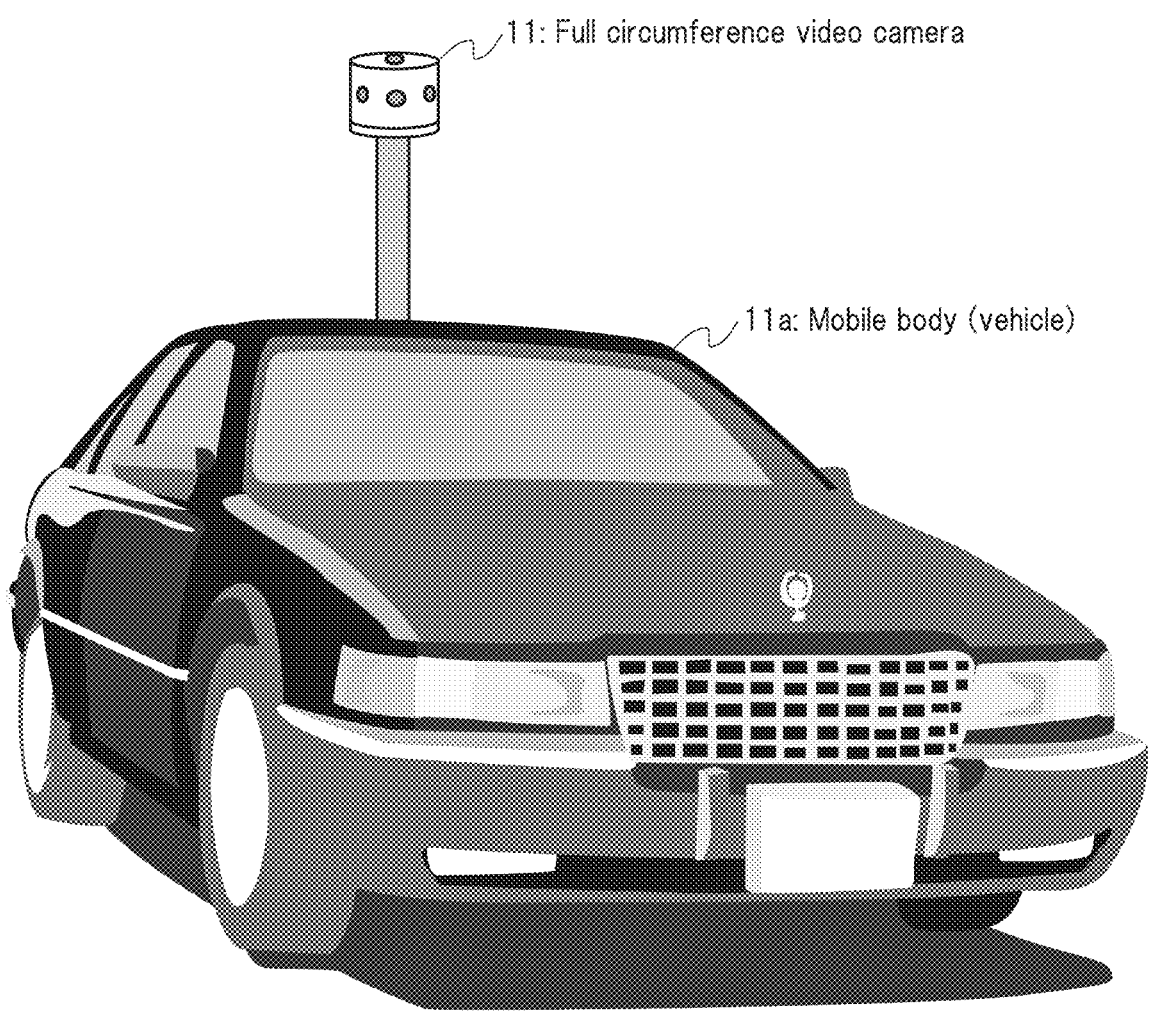
FIG. 2 is a schematic diagram showing a means which picks up a full circumference video image used in the CV calculation means shown in FIG. 1, and is a perspective view of a vehicle mounted with a full circumference camera in a roof part.
Figure 3:
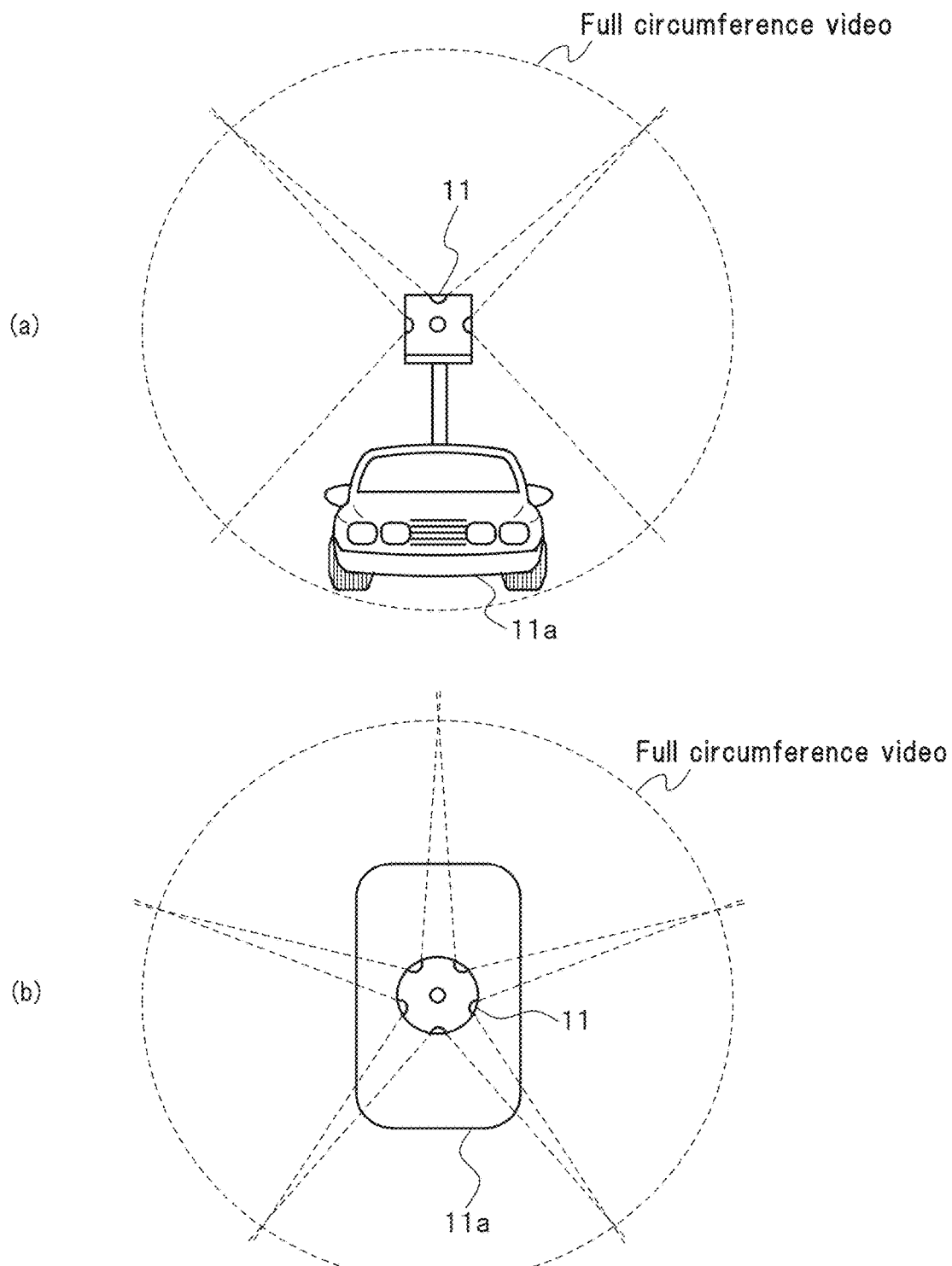
Figure 4:
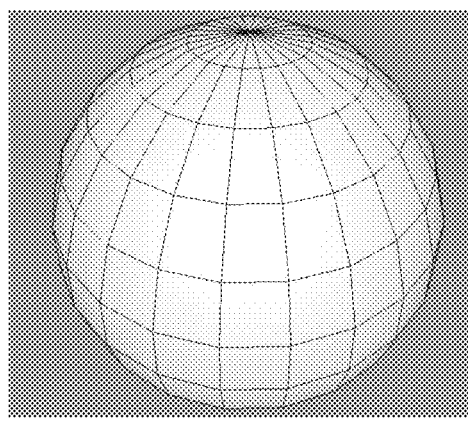
Figure 4:
Figure 4:
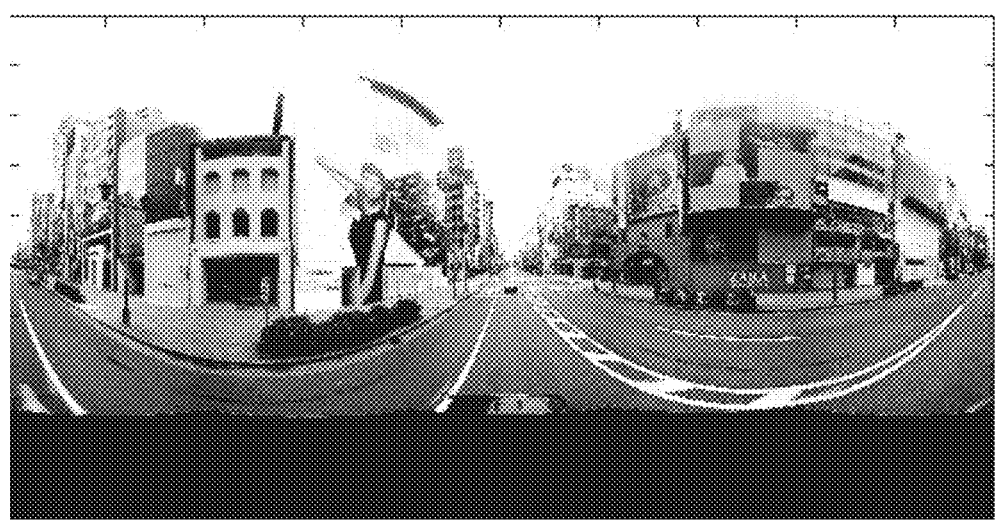

First, any video may be applied as the video used for the CV calculation, but in the video having a limited view angle, the video becomes discontinuous when the viewpoint direction is moved, and therefore the video is preferably formed into a full circumference video (see FIGS. 2 to 4). In addition, the video image is similar to the continuous still image, and can be handled in the same manner as the still image.

Further, as the video, a previously recorded video image is generally used, but the video taken in real time according to movement of the mobile body such as an automobile can be obviously used.

Then, the present embodiment has the target video acquisition unit 10 in which, as the video used for the CV calculation, the full circumference video (see FIGS. 2 to 4) obtained by picking up a full 360-degree circumference of the mobile body such as the vehicle, or a wide-angle video close to the full circumference video is used to perform planar development of the full circumference video in the viewpoint direction, whereby the target video serving as the target of arbitrary viewpoint movement is acquired and generated (see FIG. 1).

Here, the expression "perform planar development of the full circumference video means representation of the full circumference video as an ordinary image in a perspective manner. Here, the reason why such an art is referred to as "perspective" is that the full circumference video itself is displayed according to a method different from the perspective, such as the Mercator projection or a spherical projection (see FIG. 4), and therefore the projection is subjected to the planar development, whereby the projection can be converted and displayed into an ordinary perspective video.

In order to generate the full circumference video in the target video acquisition unit 10, first, as shown in FIG. 2 and FIG. 3, a full circumference video camera 11 is used to pick up a circumference of a mobile body 11a together with movement of the mobile body 11a by the full circumference video camera 11 fixed to the mobile body 11a such as a running vehicle for the purpose of acquiring the CV value data.

In addition, the mobile body 11a can have, for the purpose of acquiring position coordinates thereof, a GPS instrument alone, a position measurement instrument configured of a device obtained by adding an IMU instrument, or the like for acquiring absolute coordinates, for example.

Further, the full circumference video camera 11 mounted on the mobile body 11a may have any configuration, as long as the camera for picking up and acquiring a wide-range video is applied, and examples thereof include a camera with a wide-angle lens or a fish-eye lens, a moving camera, a fixed camera, a camera prepared by fixing a plurality of cameras and a camera rotatable in a 360-degree circumference. In the present embodiment, as shown in FIG. 2 and FIG. 3, the full circumference video camera 11 in which the plurality of cameras are integrally fixed to pick up the wide-range video in association with movement of the mobile body 11a is used for the vehicle.

Then, according to the full circumference video camera 11 as described above, as shown in FIG. 3, the camera 11 is installed to a ceiling part or the like of the mobile body 11a, whereby a full 360-degree circumference video of the camera can be simultaneously picked up by the plurality of cameras, and the mobile body 11a is moved, whereby the wide-range video can be acquired as video data.

Here, the full circumference video camera 11 is a video camera which can directly acquire the full circumference video of the camera, but if a half or more of the full circumference of the camera can be acquired as the video, such a video can be used as the full circumference video.

Further, even in the case of an ordinary camera in which the view angle is limited, although precision of the CV calculation is reduced, the image can be handled as part of the full circumference video.

In addition, the wide-range video picked up by the full circumference video camera 11 can be pasted, as one image, to a virtual spherical surface which matches the view angle at the time of pick-up.

Spherical image data pasted to the virtual spherical surface is stored and output as the spherical image (360-degree image) data in a state of being pasted to the virtual spherical surface. The virtual spherical surface can be set to an arbitrary spherical shape with a camera part for acquiring the wide-range video as a center point.

FIG. 4(a) shows an appearance image of the virtual spherical surface to which the spherical image is to be pasted, and FIG. 4(b) shows one example of the spherical surface image pasted to the virtual spherical surface. Further, FIG. 4(c) shows an image example obtained by performing planar development of the spherical image in FIG. 4(b) according to the Mercator projection.

Then, the full circumference video image generated and acquired as described above is input into the CV calculation means (CV video acquisition unit) 20 as the target video according to the invention, and the CV value data is determined (see FIG. 1).

In the CV calculation means 20, first, the feature point extraction unit 21 automatically extracts a sufficient number of feature points (reference points) from among video image data picked up and temporarily recorded by the full circumference video camera 11 of the target video acquisition unit 10.

The feature point correspondence processing unit 22 automatically tracks the feature points automatically extracted in each frame image between respective frames to automatically determine a correspondence relationship thereof.

The camera vector calculation unit 23 automatically determines, by the calculation, the camera vector in corresponding to each frame image from the three-dimensional position coordinates of the feature points in which the correspondence relationship is determined.

The error minimization unit 24 performs statistical processing so as to minimize a distribution of solutions of each camera vector by an overlap calculation of a plurality of camera positions to automatically determine a camera position direction to which error minimization processing is performed.

The three-dimensional information tracking unit 25 positions, as an approximate camera vector, the camera vector obtained by the camera vector calculation unit 23 to automatically track, based on three-dimensional information sequentially obtained as part of the image in a subsequent process, partial three-dimensional information included in the plurality of frame images according to the adjacent frame images. Here, the term "three-dimensional information (three-dimensional shape)" means mainly three-dimensional distribution information of the feature points, namely, an aggregate of three-dimensional points, in which the aggregate of the three-dimensional points forms the three-dimensional shape.

The high-precision camera vector calculation unit 26 generates and outputs, based on tracking data obtained by the three-dimensional information tracking unit 25, the camera vector with higher precision than precision of the camera vector obtained by the camera vector calculation unit 23.

Then, the camera vector obtained as described above is input into the free viewpoint movement display device 30 described later, and is used for viewpoint movement processing of the arbitrary point or target specified and selected in the video.

Several methods are available for detecting the camera vectors from the feature points of the plurality of images (videos or continuous still images). The CV calculation means 20 of the present embodiment shown in FIG. 1 is configured to automatically extract sufficiently numerous feature points in the image to automatically track the feature points, whereby three-dimensional vectors and 3-axis rotation vectors of the camera are determined according to epipolar geometry.

The sufficiently numerous feature points are taken, thereby causing overlap of camera vector information to minimize an error from the overlapped information, whereby the camera vector with higher precision can be determined.

The term "camera vector" means a vector of a degree of freedom of the camera.

In general, a stationary three-dimensional object has the 6 degrees of freedom, including the position coordinates (X, Y, Z) and the rotation angles ($\phi x$, $\phi y$, $\phi z$) of the respective coordinate axes.

Accordingly, the camera vector refers to the vector having the 6 degrees of freedom (6 variables), including the position coordinates (X, Y, Z) of the camera and the rotation angles (φx, φy, φz) of the respective coordinate axes. In addition, when the camera is moved, a movement direction is also included in the degree of freedom, but the direction can be derived by differentiating the 6 degrees of freedom (variables) described above.

Thus, the expression "camera vector detection" of the present embodiment means that the camera takes values having the 6 degrees of freedom for each frame to determine the 6 degrees of freedom different for each frame.

Figure 5:
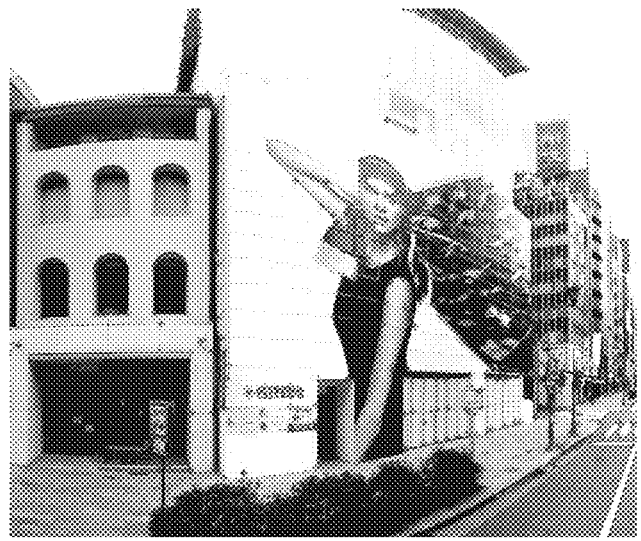
FIGS. 5(a), 5(b) and 5(c) are explanatory diagrams showing a specific camera vector detection method in a CV calculation means according to one embodiment of the invention.
Figure 5:
Figure 5:

Hereinafter, a specific camera vector detection method in the CV calculation means 20 will be described with reference to FIG. 5 and subsequent drawings.

First, image data acquired by the full circumference video camera 11 of the target video acquisition unit 10 described above is indirectly or directly input into the feature point extraction unit 21 of the CV calculation means 20, and in the feature point extraction unit 21, points or small region images to be the feature points are automatically extracted in an appropriately sampled frame image, and in the feature point correspondence processing unit 22, the correspondence relationship of the feature points among the plurality of frame images is automatically determined.

Figure 6:
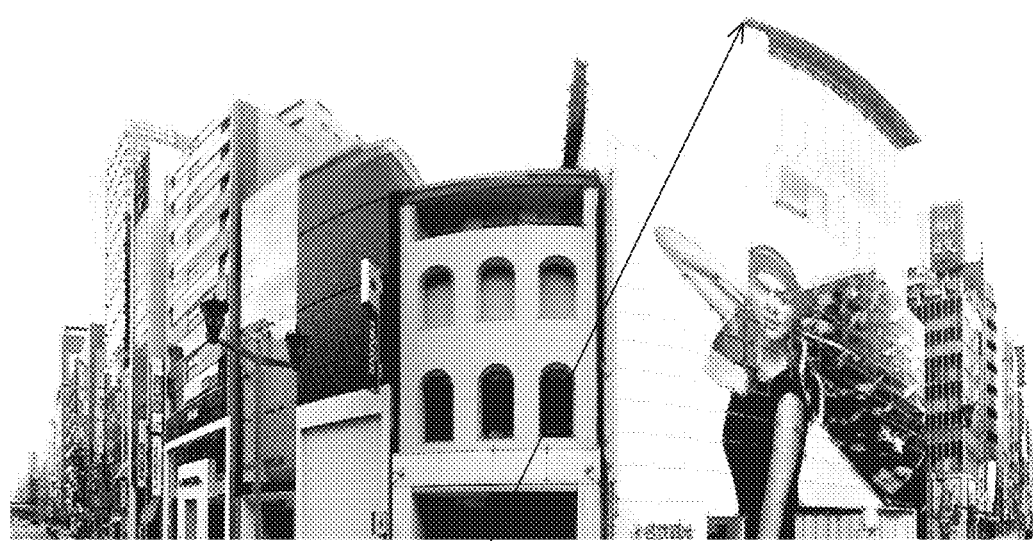
FIG. 6 is an explanatory diagram showing a specific camera vector detection method in a CV calculation means according to one embodiment of the invention.
Figure 6:
Figure 7:
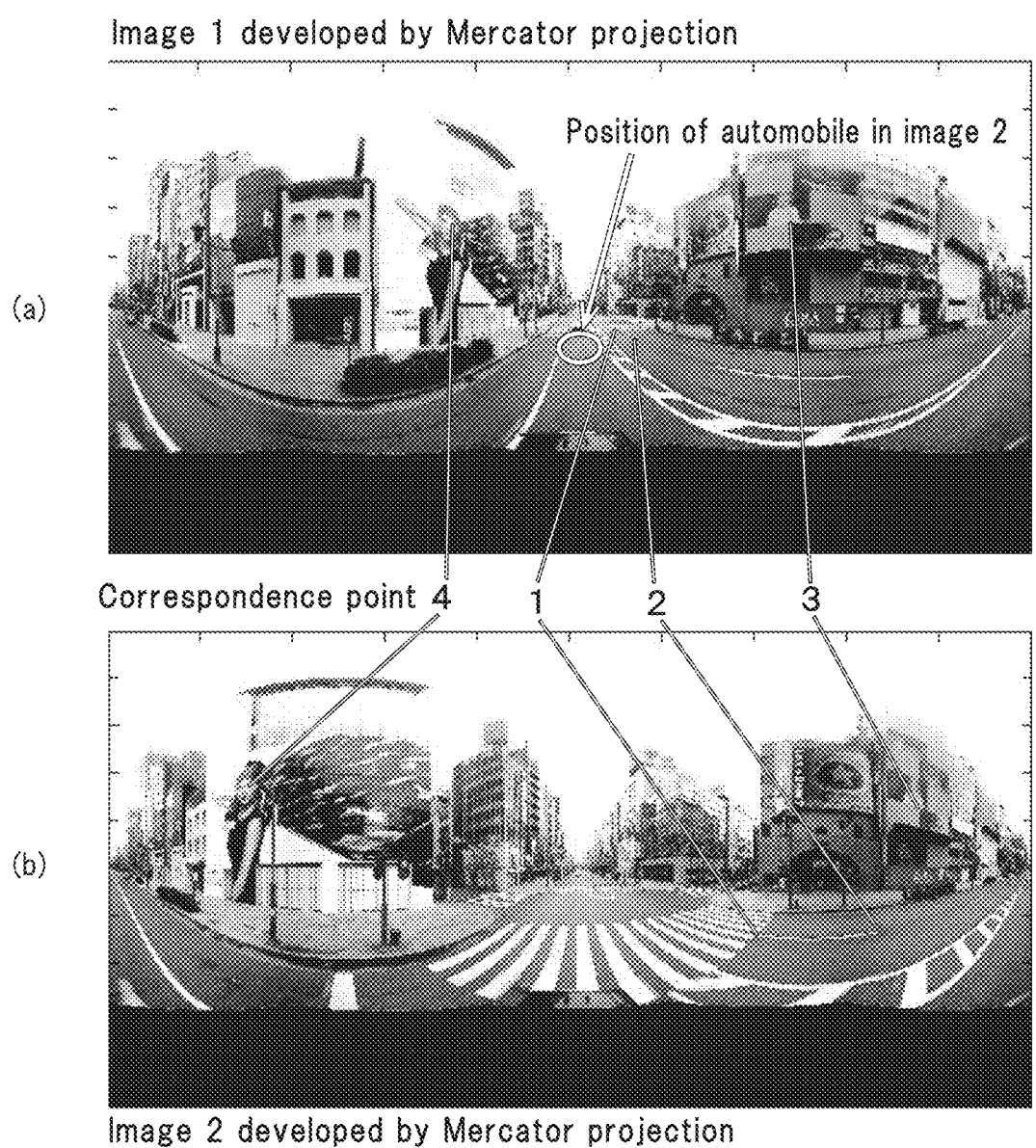
FIGS. 7(a) and 7(b) are explanatory diagrams showing a specific camera vector detection method in a CV calculation means according to one embodiment of the invention.

Specifically, the sufficiently necessary number or more of feature points serving as the reference of the camera vector detection is determined. One example of the feature points and the correspondence relationship thereof between the images is shown in FIG. 5 to FIG. 7. A plus mark "+" in the figure represents the feature point automatically extracted, and the correspondence relationship is automatically tracked among the plurality of frame images (see correspondence points 1 to 4 shown in FIG. 7).

Figure 8:
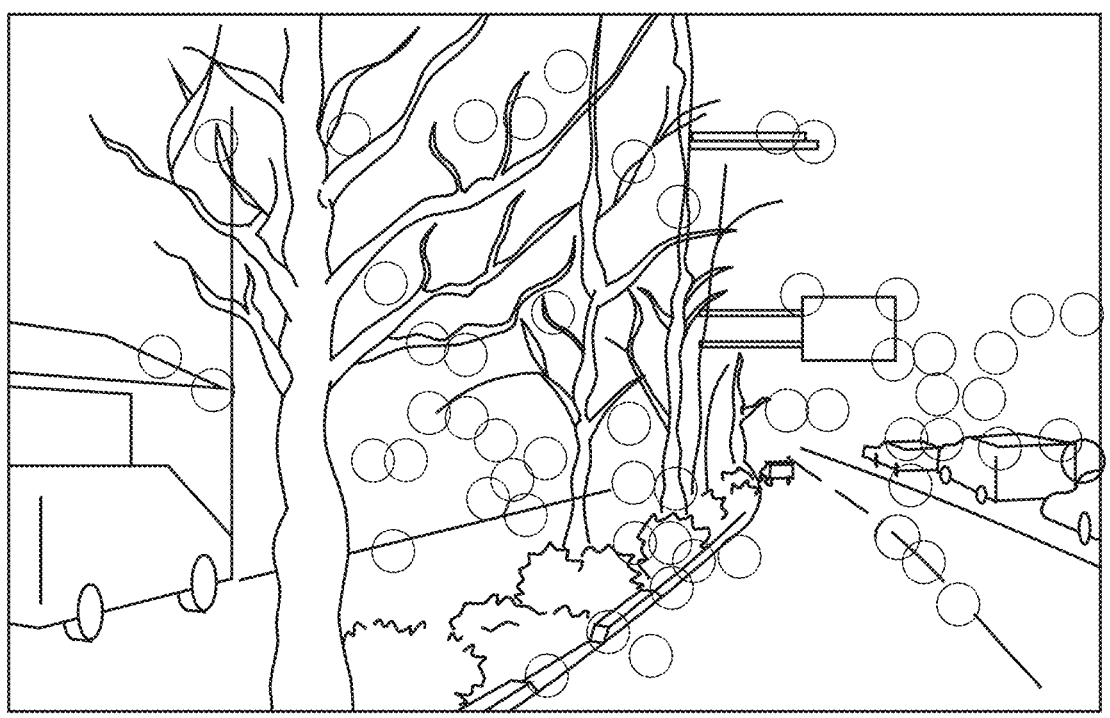
FIG. 8 is an explanatory diagram showing a specified aspect of desirable feature points in a camera vector detection method by a CV calculation means according to one embodiment of the invention.

Here, in extraction of the feature points, as shown in FIG. 8, the sufficiently numerous feature points are desirably specified and extracted in each image (see circle marks in FIG. 8), and the feature points of about 100 are extracted, for example.

Subsequently, in the camera vector calculation unit 23, the three-dimensional coordinates of the feature points extracted are determined by the calculation, and based on the three-dimensional coordinates, the camera vectors are determined by the calculation. Specifically, the camera vector calculation unit 23 continuously calculates, by the calculation, relative values of the sufficient number of feature points existing between the continuous respective frames to various three-dimensional vectors, such as a position vector between the moving cameras, the 3-axis rotation vector of the camera, and a vector connecting each camera position with each feature point.

The present embodiment is configured to solve an epipolar equation from the epipolar geometry of the full 360-degree circumference image to calculate a camera motion (camera position and camera rotation), for example.

Images 1 and 2 shown in FIG. 7 represent images obtained by developing the full 360-degree circumference images according to the Mercator projection, and when a latitude is taken as φ and a longitude is taken as θ, a point on the image 1 is represented by (θ1, φ1), and a point in the image 2 is represented by (θ2, φ2). Then, spatial coordinates in respective cameras are represented by equations: $z1=(\cos φ1 \cos θ1, \cos φ1 \sin θ1, \sin φ1)$ and $z2=(\cos φ2 \cos θ2, \cos φ2 \sin θ2, \sin φ2)$. When a movement vector of the camera is taken as t and a rotation matrix of the camera is taken as R, an equation: $z1^T[t] \times Rz2=0$ represents the epipolar equation.

The sufficient number of feature points is given, whereby t and R can be calculated as a solution by a least square method by a linear algebra calculation. This calculation is applied to a plurality of frames corresponding thereto to perform the calculation.

Here, as the image used for a camera vector calculation, the full 360-degree circumference image is preferably used.

As the image used for the camera vector calculation, any image may be used in principle, but a wide-angle image such as the full 360-degree circumference image shown in FIG. 7 facilitates to select numerous feature points. Then, in the present embodiment, the full 360-degree circumference image is used for the CV calculation, whereby a tracking distance of the feature point can be lengthened, the sufficiently numerous feature points can be selected, and the feature points convenient for each of a long distance, a middle distance and a short distance can be selected. Further, when the rotation vector is corrected, polar rotation conversion processing is added thereto, whereby calculation processing can be easily performed. Accordingly, calculation results with higher precision can be obtained.

In addition, in order to easily understand processing in the CV calculation means 20, FIG. 7 show the images obtained by developing full 360-degree circumference spherical images obtained by synthesizing the images picked up by one camera or a plurality of cameras, according to the Mercator projection as referred to in a map projection. However, in the CV calculation in practice, the image is not necessarily the image developed according to the Mercator projection.

Next, in the error minimization unit 24, the vectors based on the respective feature points are calculated in a plurality of ways and determined by calculation equations generated in the plurality of ways according to the plurality of camera positions and the plurality of feature points corresponding to the respective frames to perform statistical processing so as to minimize a distribution of the positions of the respective feature points and the camera positions to determine a final vector. For example, an optimum solution of the least square method is estimated for the camera positions, the camera rotations and the plurality of feature points in the plurality of frames according to the Levenberg-Marquardt method, and an error is converged to determine the coordinates of the camera positions, camera rotation matrices and the feature points.

Further, the feature point having a large error distribution is deleted, and the vector is recalculated based on other feature points to improve precision of the calculation in each feature point and in the camera position.

Thus, the positions of the feature points and the camera vectors can be determined with satisfactory precision.

Figure 9:
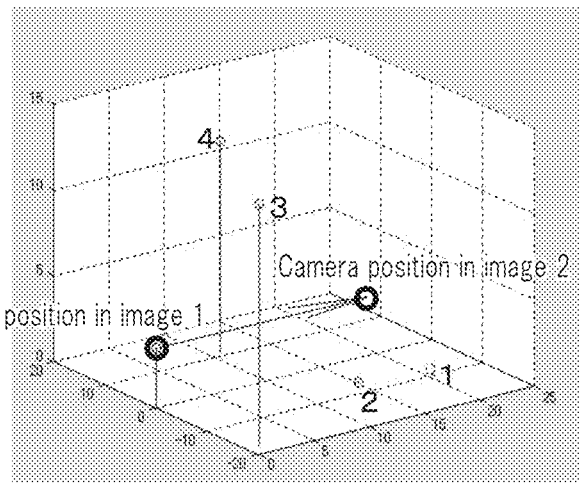
FIGS. 9(a), 9(b) and 9(c) are graphs showing examples of three-dimensional coordinates of feature points and camera vectors obtained by a CV calculation means according to one embodiment of the invention.
Figure 9:
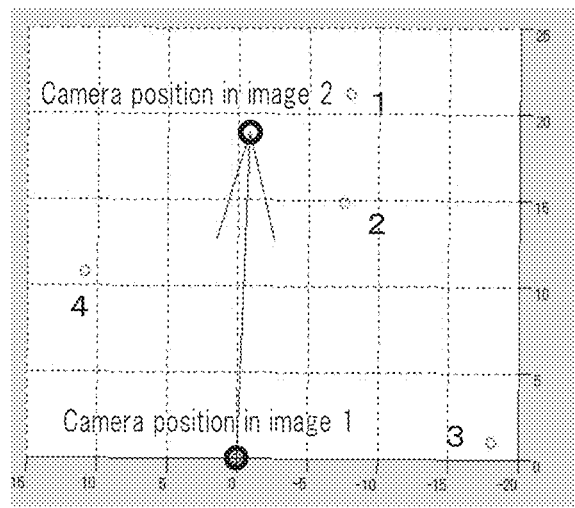
Figure 9:
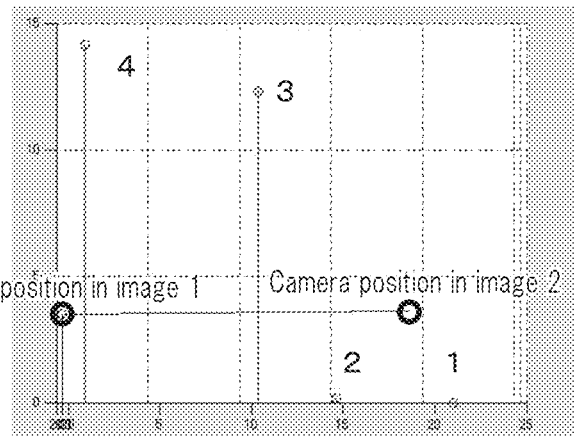
Figure 10:
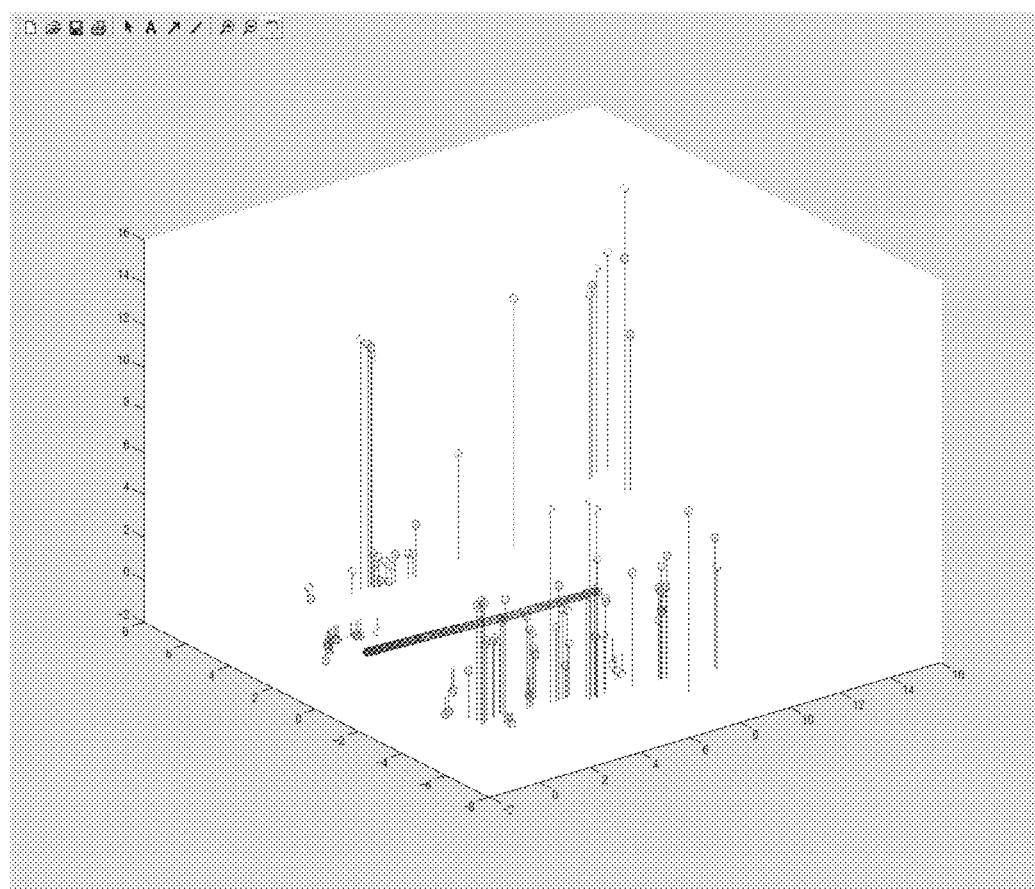
FIG. 10 is a graph showing an example of three-dimensional coordinates of feature points and camera vectors obtained by a CV calculation means according to one embodiment of the invention.
Figure 11:
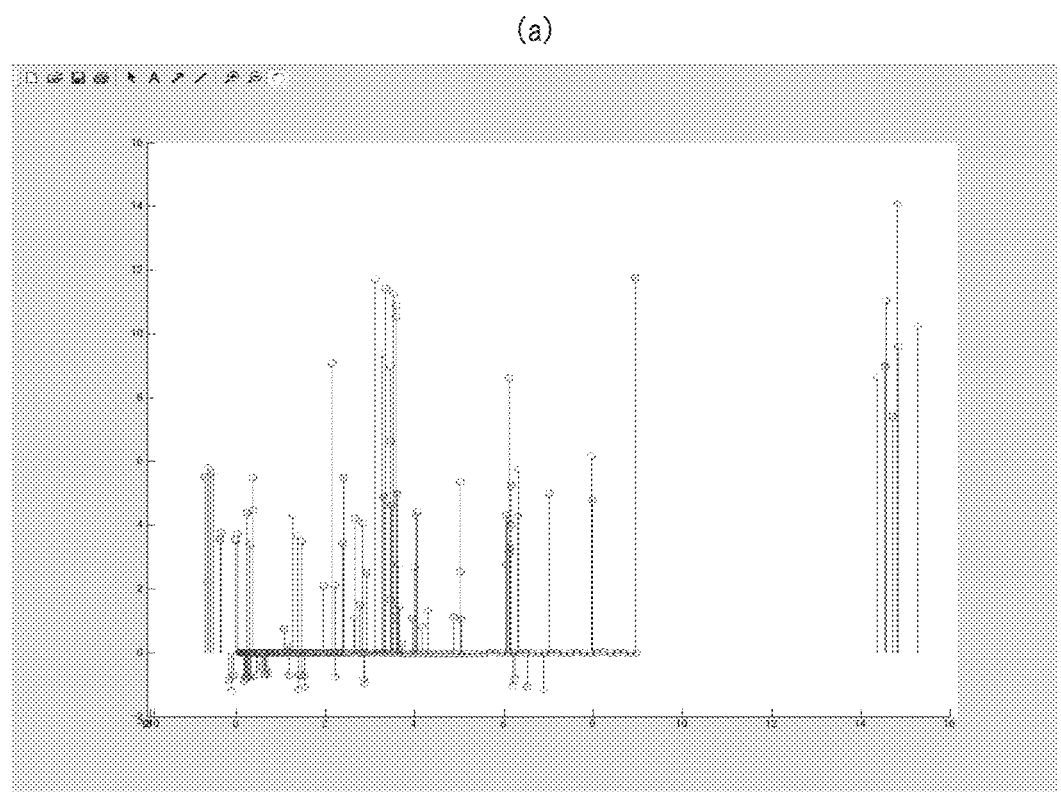
FIGS. 11(a) and 11(b) are graphs showing examples of three-dimensional coordinates of feature points and camera vectors obtained by a CV data calculation means according to one embodiment of the invention.
Figure 11:
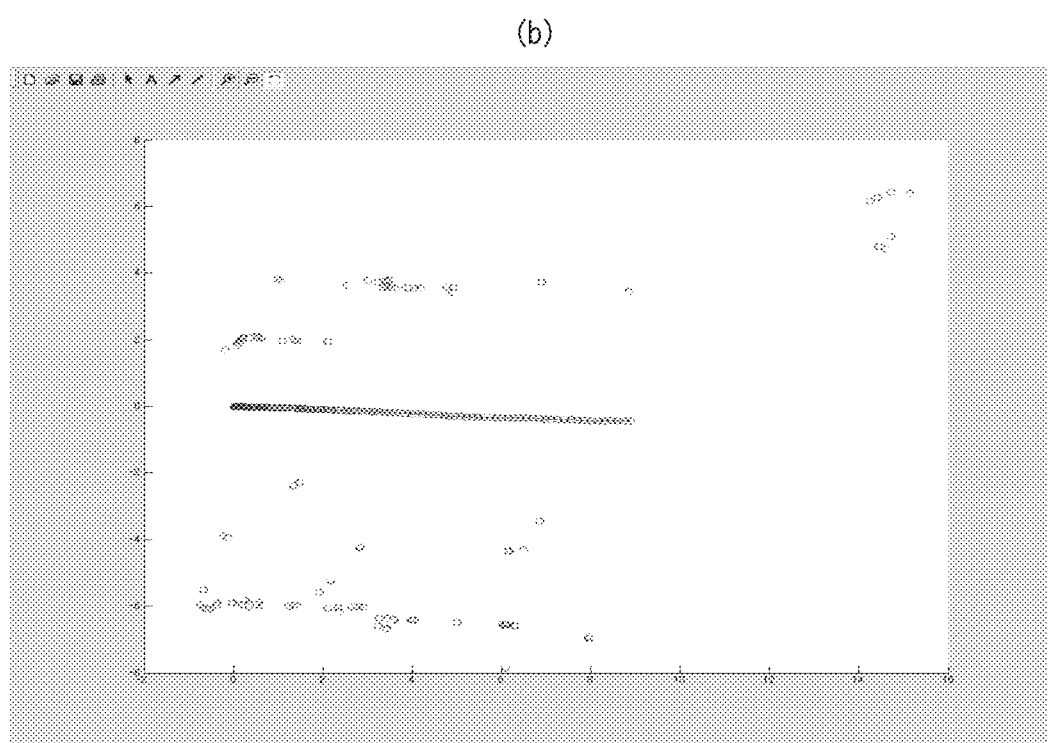

FIG. 9 to FIG. 11 each show an example of the three-dimensional coordinates of the feature points and the camera vectors obtained by the CV calculation. FIG. 9 to FIG. 11 are an explanatory diagram showing a vector detection method by the CV calculation according to the present embodiment, and a diagram showing a relative positional relationship between the camera and the target obtained by the plurality of frame images acquired by the moving camera.

FIG. 9 shows three-dimensional coordinates of feature points 1 to 4 shown in the images 1 and 2 in FIG. 7, and a camera vector (X, Y, Z) moving between the image 1 and the image 2.

FIG. 10 and FIG. 11 each show positions of feature points obtained from sufficiently numerous feature points and the frame images, and positions of the moving cameras. In FIG. 10 and FIG. 11, linearly continuous circle marks in a center of the graph represent the camera positions, and circle marks positioned in the circumferences represent positions and heights of the feature points.

Figure 12:
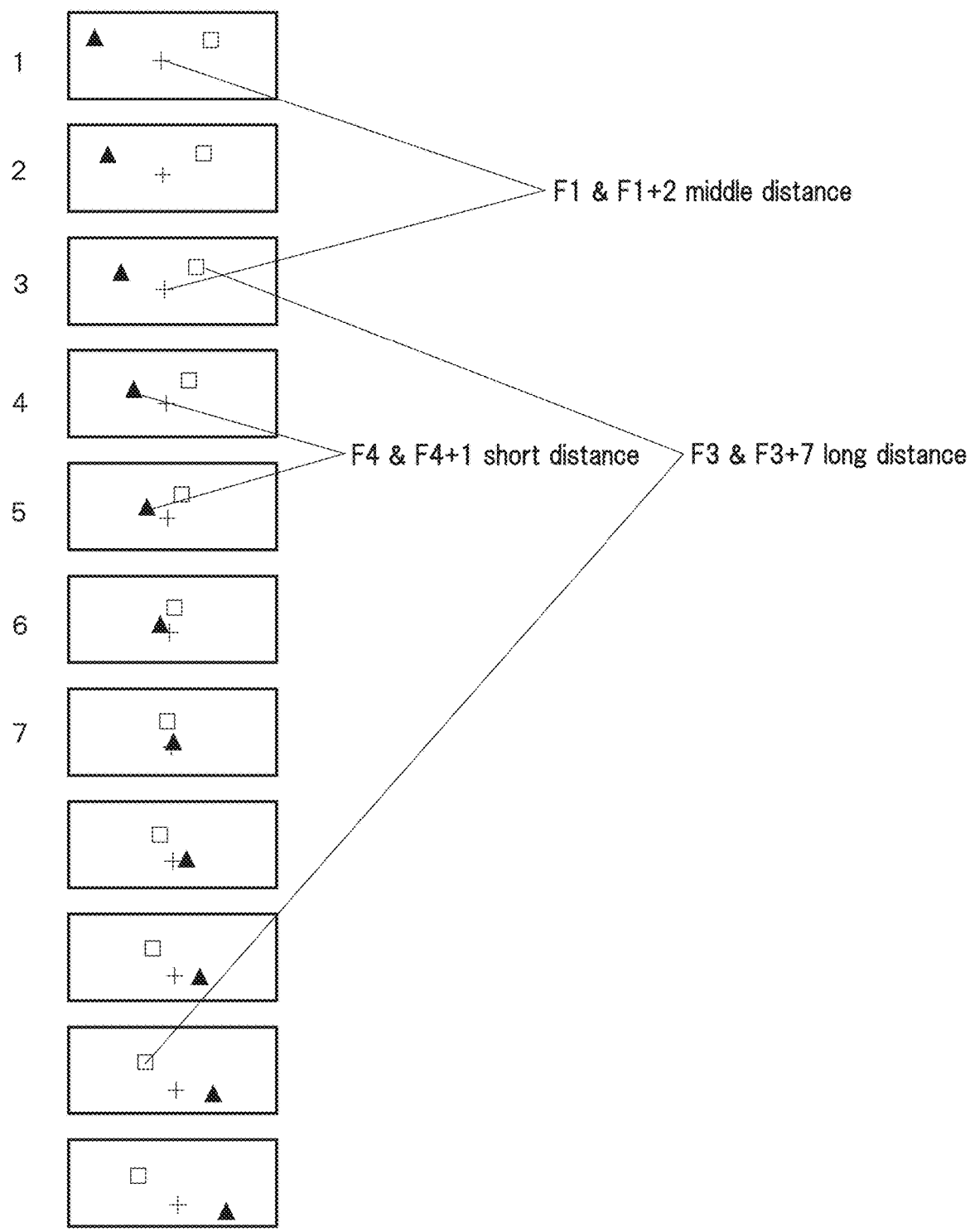
FIG. 12 is an explanatory diagram showing a case where a plurality of feature points are set according to distances from cameras to the feature points to track the feature points over adjacent frames, whereby a plurality of calculations are repeatedly performed according to one embodiment of the invention.

Here, in order to obtain, at a high speed, the three-dimensional information with higher precision for the feature points and the camera positions in the CV calculation, as shown in FIG. 12, in the CV calculation means 20, the plurality of feature points are set according to a distance from the camera to the feature point, and a plurality of calculations are repeatedly performed.

Specifically, in the CV calculation means 20, upon automatically detecting the feature point having a visual feature in the image to determine a correspondence point of the feature point in each frame image, a focus is placed on n-th and (n+m)-th two frame images Fn and (Fn+m) to be used for the camera vector calculation, and the two frame images are applied as a unit calculation, whereby the unit calculation in which n and m are appropriately set can be repeated.

Then, m represents a frame interval, in which the feature points are classified into a plurality of stages according to the distance from the camera to the feature point in the image, and m is set to be larger as the distance from the camera to the feature point is larger, and m is set to be smaller as the distance from the camera to the feature point is smaller. The reason is that, accordingly as the distance from the camera to the feature point is larger, a change in the position between the images is smaller.

Then, while classifications of the feature points according to an m value are sufficiently overlapped, a plurality stages of m are set, and as n continuously progresses according to progress of the image, the calculation is continuously progressed. Then, a plurality of times of overlap calculations are performed on the same feature point in the progress of n and each stage of m.

Thus, the unit calculation focused on the frame images Fn and (Fn+m) is performed, whereby a precise camera vector is calculated by taking a long period of time among the respective frames sampled for each m frame (dropped between the frames), and a simple calculation which can be performed by short-time processing can be applied in m frames between the frame images Fn and (Fn+m) (minimum unit frame).

If no error exists in a precise camera vector calculation for each m frame, both ends of the camera vector in the m frames are overlapped with the camera vectors Fn and (Fn+m) obtained by performing the high-precision calculation. Accordingly, the camera vector is determined by the simple calculation for the m frames as the minimum unit frame between Fn and (Fn+m), and a scale of the camera vector in the continuous m frames can be adjusted so that both ends of the camera vector in the m frames as the minimum unit frame determined by the simple calculation may match the camera vector of Fn and (Fn+m) determined by the high-precision calculation.

Thus, n continuously progresses according to the progress of the image, thereby adjusting the scale so that the error of each camera vector obtained by the plurality of times of calculations on the same feature point may be minimized to integrate the camera vectors, whereby a final camera vector can be determined.

Accordingly, while the camera vector having no error and with high precision is determined, the simple calculation is combined therewith, whereby a speed of calculation processing can be increased.

Here, the simple calculation has various methods according to the precision. Specific examples include: (1) a method in which, when numerous feature points of 100 or more are used in the high-precision calculation, feature points of about 10 at a minimum are used in the simple calculation; and (2) a method in which, even with the same number of feature points, if a feature point and a camera position are considered to be equivalent, innumerable triangles are established and equations in the same number are established, and therefore the number of the equations is reduced, whereby such operation can be taken as the simple calculation.

Accordingly, the camera vectors are integrated in the form of adjusting the scale so that the error of each feature point and the camera position may be minimized, and a distance calculation is performed, and the feature point having a large error distribution is deleted, and when necessary the vector is recalculated on other feature points, whereby the precision of the calculation in each feature point and the camera position can be improved.

Further, such a high-speed simple calculation is performed, whereby processing of the camera vector close to real time can be achieved. In high-speed calculation processing of the camera vector, the calculation is performed with the minimum number of frames in which objective precision can be kept and the minimum number of feature points automatically extracted to determine and display an approximate value of the camera vector by a high-speed calculation. Next, accordingly as the images are accumulated, the number of frames is increased and the number of feature points is increased to perform the camera vector calculation with higher precision, whereby the camera vector can be displayed by the camera vector with high precision in place of the approximate value.

Further, according to the present embodiment, in order to determine the camera vector with higher precision, the three-dimensional information (three-dimensional shape) can be tracked.

Specifically, first, in the three-dimensional information tracking unit 25, the camera vector obtained through the camera vector calculation unit 23 and the error minimization unit 24 is positioned as the approximate camera vector, and based on the three-dimensional information (three-dimensional shape) obtained as part of the image to be generated in the subsequent process, partial three-dimensional information included in the plurality of frame images is continuously tracked among adjacent frames to automatically track the three-dimensional shape.

Then, from track results of the three-dimensional information obtained by the three-dimensional information tracking unit 25, the camera vector with higher precision can be determined in the high-precision camera vector calculation unit 26.

In the feature point extraction unit 21 and the feature point correspondence processing unit 22 described above, the feature points are automatically tracked in the images among the plurality of frames, but the feature points are lost or the like, whereby the number of frames in which the feature points are tracked is limited in several cases. Further, the image is two-dimensional and the shape changes on the way of tracking, and therefore tracking precision also has a predetermined limitation.

Accordingly, the camera vector obtained by feature point tracking is positioned as the approximate value, the three-dimensional information (three-dimensional shape) to be obtained in the subsequent process is tracked on each frame image, whereby the camera vector with high precision can be determined from a locus thereof.

In tracking of the three-dimensional shape, the precision of matching and correlation can be easily obtained, and neither the three-dimensional shape nor the size thereof changes depending on the frame image, and therefore the three-dimensional shape can be tracked over a great number of frames, whereby the precision of the camera vector calculation can be improved, which can be achieved because the approximate camera vector is already known by the camera vector calculation unit 23, and the three-dimensional shape is already known.

When the camera vector has the approximate value, the error of the three-dimensional coordinates over significantly numerous frames is accumulated and gradually increased to be a large error in a long distance because the number of frames relating to each frame by the feature point tracking is small. However, the error of the three-dimensional shape when part of the image is cut out is relatively small, and an effect on a change in the shape and the size is significantly reduced. Therefore, comparison or tracking in the three-dimensional shape becomes significantly advantageous over the comparison or the tracking at a time of tracking in a two-dimensional shape. In the tracking, in the case of the tracking in the two-dimensional shape, the data is tracked while the change in the shape and the size in the plurality of frames remains inevitable, and therefore problems of causing the large error or no finding of the correspondence point have remained. However, in the tracking in the three-dimensional shape, the change in the shape is significantly small, and the tracking has no change in the size in principle, and therefore precise tracking can be achieved.

Here, examples of the three-dimensional shape data serving as the target to be tracked include a three-dimensional distribution shape of a feature point, and a polygon surface determined from the three-dimensional distribution shape of the feature point.

Further, the three-dimensional shape obtained is converted into a two-dimensional image from the camera position, whereby the data can also be tracked as the two-dimensional image. The approximate value of the camera vector is already known, and therefore a projection can be converted into the two-dimensional image from a camera viewpoint, and the tracking can also follow the change in the shape of the target by movement of the camera viewpoint.

The camera vector determined as described above can be overlaid and displayed in the video image picked up by the full circumference video camera 11.

Figure 13:
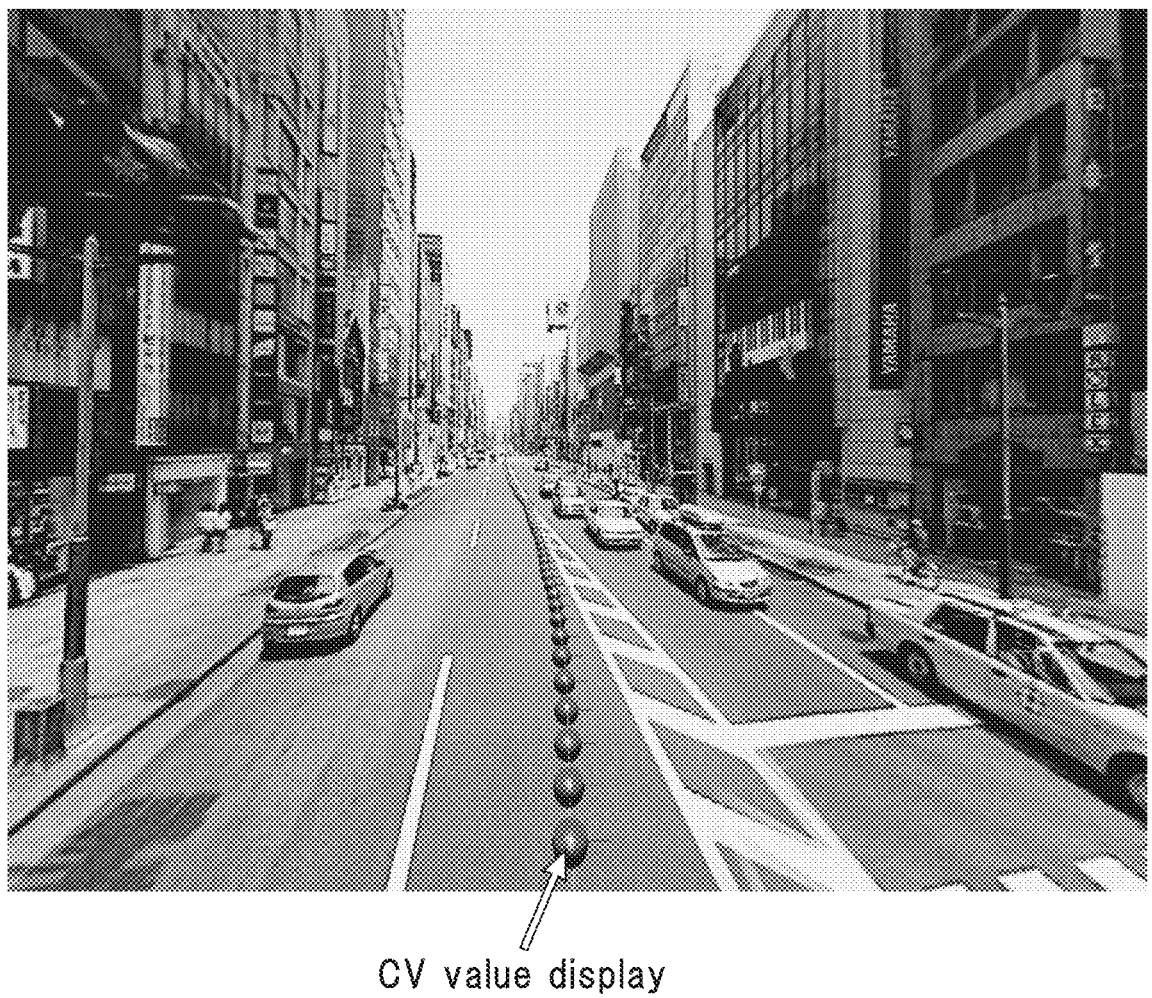
FIG. 13 shows a diagram when loci of camera vectors determined by a CV data calculation means according to one embodiment of the invention are displayed in a video image.

For example, as shown in FIG. 13, a video from a vehicle-mounted camera is subjected to planar development to automatically search correspondence points on an objective plane surface in each frame image, thereby combining the correspondence points so as to be matched with each other to generate combined images on the objective plane surface, and the combined images are integrated and displayed in the same coordinate system.

Further, the camera positions and camera directions are detected one after another in a common coordinate system, whereby the positions, the directions and the loci thereof can be plotted. The CV data represents the three-dimensional position and a 3-axis rotation, and is overlaid and displayed on the video image, whereby the CV value can be simultaneously observed in each frame of the video image. FIG. 13 shows an image example in which the CV data is overlaid and displayed on the video image.

In addition, if the camera positions are accurately displayed in the video image, the position in the video image to be represented by the CV value is central in the image, and when camera movement is close to a straight line, all the CV values in the frames are overlapped and displayed. Therefore, for example, as shown in FIG. 13, it is appropriate to dare to display a position of 1 meter directly below from the camera position. Alternatively, it is more appropriate to display the CV value at a height of a road surface based on a distance to the road surface.

[Free Viewpoint Movement Display Device]

Next, an embodiment of the free viewpoint movement display device according to the invention in which viewpoint movement display processing of the arbitrary point and target in the target video is performed, to be executed based on the target video (CV video) provided with the CV value determined as described above, will be specifically described with reference to drawings.

Figure 14:
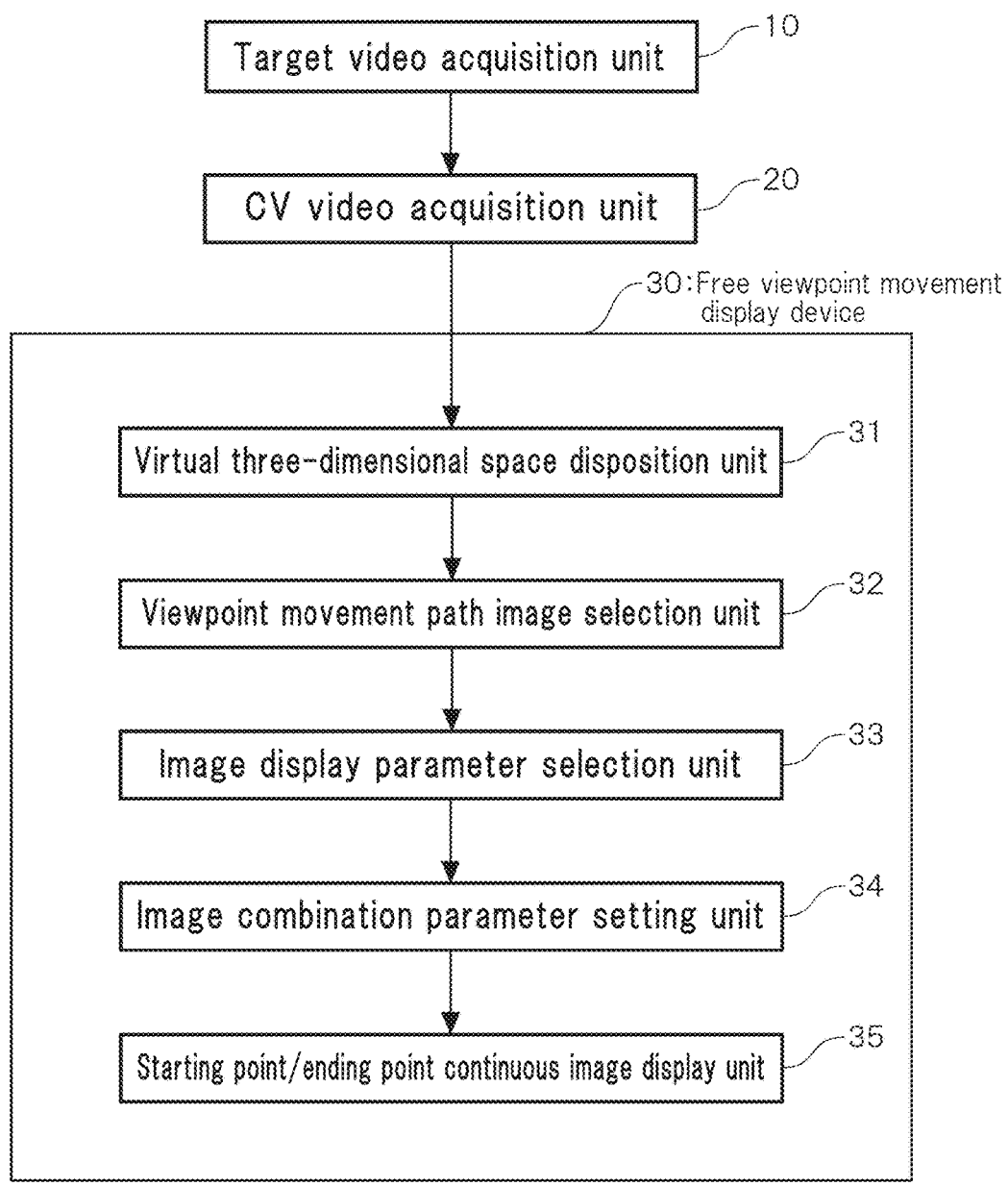
FIG. 14 is a block diagram showing a basic configuration of a free viewpoint movement display device according to one embodiment of the invention.

FIG. 14 is a block diagram showing a basic configuration of a free viewpoint movement display device 30 according to one embodiment of the invention.

In addition, in the present embodiment shown in FIG. 14, the free viewpoint movement display device 30, a target video acquisition unit 10 and a CV video acquisition unit 20 are shown as another device configuration, but any one or both of the target video acquisition unit 10 and the CV video acquisition unit 20 can also be obviously included as a component of the free viewpoint movement display device 30.

As shown in FIG. 14, the free viewpoint movement display device 30 according to the present embodiment is a device or means in which, on the premise of the target video (CV video) provided with the CV value as described above, the arbitrary point or target in the video is specified and selected, thereby selecting the optimum path over the plurality of frame images to move the viewpoint toward the specified point and target for enabling to reproduce the target video as the video (continuous image) by the smooth viewpoint movement without distortion (loss of shape, omission of information or addition of erroneous information) as in the CG obtained by pasting a texture.

Specifically, the free viewpoint movement display device 30 according to the present embodiment is configured so as to function, together with the target video acquisition unit 10 and the CV video acquisition unit 20, as each unit of a virtual three-dimensional space disposition unit 31, a viewpoint movement path image selection unit 32, an image display parameter selection unit 33, an image combination parameter setting unit 34 and a starting point/ending point continuous image display unit 35.

The target video acquisition unit 10 is a means for picking up and acquiring a reference video for generating a reference video map of the free viewpoint movement display to structure a video acquisition means in claim 1 of the present application.

In the present embodiment, as shown in FIGS. 1 to 3 described above, the target video acquisition unit 10 is configured of the mobile body 11a such as a running vehicle provided with the full circumference video camera 11.

This mobile body 11a runs a predetermined road or the like in a predetermined range for the purpose of acquiring the reference video map to pick up and acquire, by the full circumference video camera 11 provided on the mobile body 11a, the video around the mobile body as the target video in association with movement of the mobile body 11a.

The target video acquired by this target video acquisition unit 10 is input into the CV video acquisition unit 20, whereby creation processing of the CV video based on the CV calculation described above is performed (see FIGS. 1 to 13).

The camera vector (CV) video acquisition unit 20 is a CV video acquisition means which generates a CV video obtained by adding a CV value to a target video on which a CV calculation is performed to obtain the CV value representing three-dimensional coordinate values and posture values of a camera position and posture of the target video picked up by a predetermined video acquisition means (target video acquisition unit 10) in claim 1 of the present application.

Specifically, the CV video acquisition unit 20 is configured of the CV calculation means shown in FIGS. 1 to 13 as described above. A specific content of the CV calculation by the CV video acquisition unit 20 is as described above (see FIGS. 1 to 13).

The virtual three-dimensional space disposition unit 31 is a means which disposes, in a virtual space, a plurality of CV videos obtained by adding the CV values representing the three-dimensional coordinate values of the camera position and posture to be generated by the CV video acquisition unit 20, in accordance with the three-dimensional coordinates, to structure a virtual three-dimensional space disposition means in claim 1 of the present application.

Figure 15:
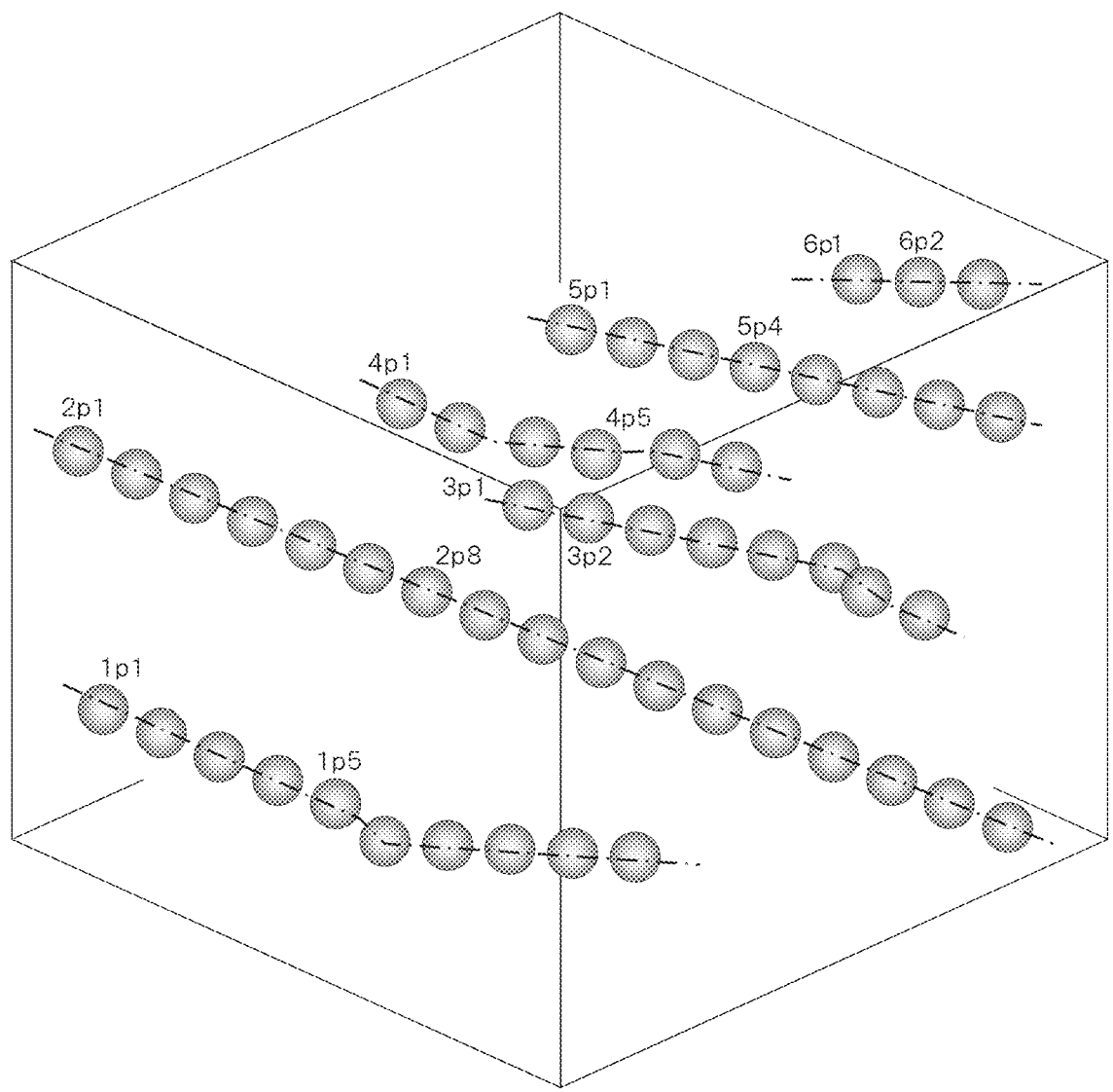
FIG. 15 is an explanatory diagram schematically showing a state in which CV values acquired from a target video are disposed in a three-dimensional virtual space in the free viewpoint movement display device shown in FIG. 14.

FIG. 15 schematically shows a state in which the CV values acquired from the target video by the virtual three-dimensional space disposition unit 31 are disposed in a three-dimensional virtual space.

In FIG. 15, alphanumeric characters represented by a plurality of spherical bodies represent the CV values provided for a continuous frame image of the target video, and relative three-dimensional coordinate information indicating the position and the posture of a video camera or the like picking up each frame image to represent that each frame image forms a continuous image which is continuous from [1p1]→→ • • • [1 p5]→→ • • • [2p1]→→ • • • [2p8]→→ • • • [3p1]→[3p2]→→ • • • [4p1]→→ • • • [4p5]→→ • • • [5p1]→ • • • [5p4]→→ • • • [6p1] [26p2]→→ • • • .

Thus, the CV values (camera positions and postures) of each frame image of the target video are disposed in the three-dimensional virtual space, whereby a relative position of each frame image is three-dimensionally identified and established, and the viewpoint movement/viewpoint direction movement of the arbitrary point or target in the video is enabled.

The viewpoint movement path image selection unit 32 is a means which selects, from among the plurality of CV videos disposed in the three-dimensional virtual space as described above, a plurality of image frames closest to scheduled viewpoint movement coordinates in a suitable interval according to the scheduled viewpoint movement coordinates to structure a viewpoint movement path selection means in claim 1 of the present application.

Specifically, the viewpoint movement path image selection unit 32 specifies coordinates of a starting point and an ending point of the plurality of image frames, and a progress point of the starting point and the ending point.

Figure 16:
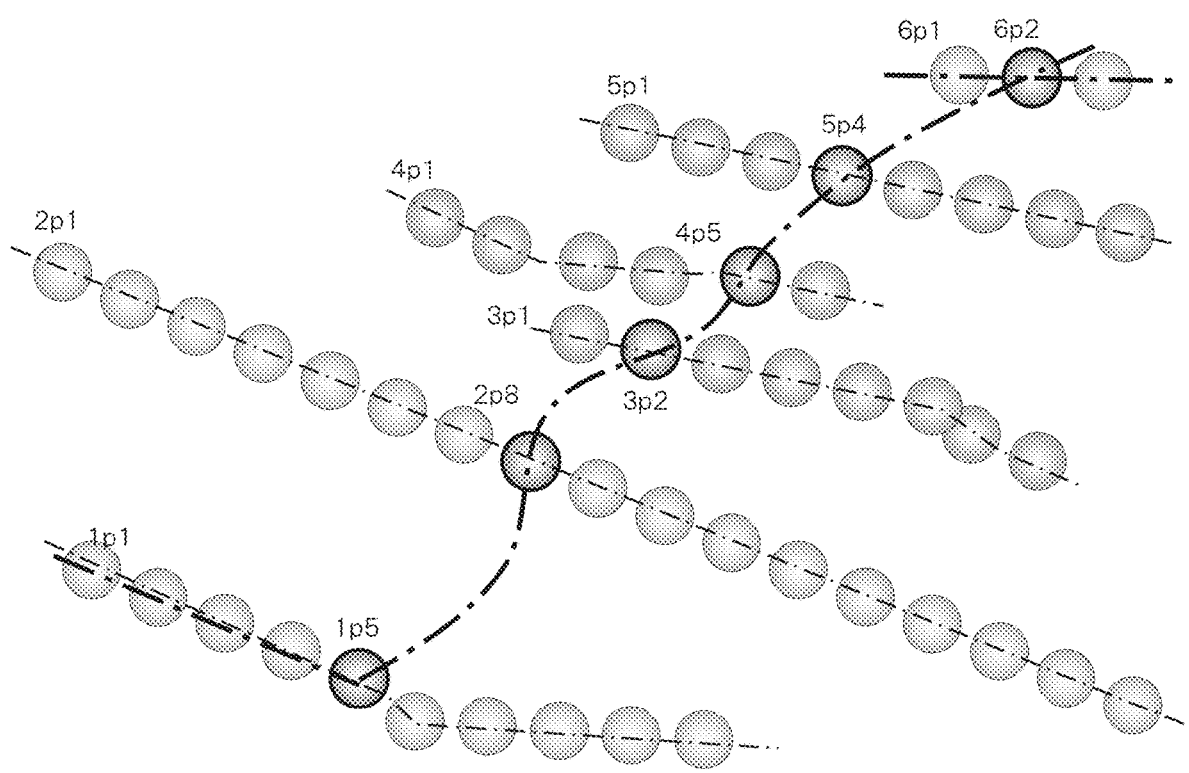
FIG. 16 is an explanatory diagram schematically showing a detail of the CV values disposed in the three-dimensional virtual space shown in FIG. 15.

FIG. 16 schematically shows a state in which the coordinates of the starting point and the ending point of the plurality of image frames disposed in the virtual three-dimensional space, and the progress point of the starting point and the ending point are specified.

FIG. 16 shows a case where, in a continuous frame image (CV value) of the target video, [1p1] is taken as a starting point, and [6p2] is taken as an ending point, and from among of the respective continuous frame images that exist therebetween, points: [1p5]→[2p8]→[3p2]→[4p5]→[5p4] are specified as the progress point.

Thus, from among the plurality of frame images of the target video, the starting point and the ending point, and the progress point thereof are specified, whereby the viewpoint movement/viewpoint direction movement of the arbitrary point or target in the video is enabled.

The image display parameter selection unit 33, the image combination parameter setting unit 34 and the starting point/ending point continuous image display unit 35 are a means which converts the viewpoint direction and the viewpoint movement direction of the plurality of image frames selected and specified as described above so as to match a scheduled direction, and sequentially combines the selected image frames to generate a continuous image formed of the video image or the continuous still image to structure a continuous image generation means in claim 1 of the present application.

According to the thus generated continuous image, the image of visually smooth viewpoint movement and smooth viewpoint direction movement is output and displayed in a display means of the computer or the like, for example.

The image display parameter selection unit 33 selects a parameter such as a size of each image, an enlargement ratio of a zoom, a view angle, a coordinate of a viewpoint and a posture for the plurality of image frames in which the starting point and the ending point, and the progress point thereof are specified and selected as described above.

At least any one of the parameters is selected, and a plurality of parameters are desirably partly or wholly selected.

The image combination parameter setting unit 34 sets at least any one of the plurality of the respective parameters as described above as a combination parameter for combining the plurality of image frames in which the starting point and the ending point, and the progress point thereof are specified and selected.

The image display parameter selection unit 33 and the image combination parameter setting unit 34 described above structure an image combination parameter setting means in claim 2 of the present application.

The starting point/ending point continuous image display unit 35 is a means which generates, based on setting of the combination parameter selected and set as described above, a moving locus in a three-dimensional space, including the starting point and the ending point of the plurality of image frames, and the progress point thereof to structure a starting point/ending point continuous image display means in claim 2 of the present application.

According to the image display parameter selection unit 33, the image combination parameter setting unit 34 and the starting point/ending point continuous image display unit 35 as described above, each image is displayed in matching a change in a size of an important target in the plurality of continuous images, whereby a plurality of inter-images selected can be continuously displayed.

A detail of processing and operation of viewpoint movement display in the target video by this free viewpoint movement display device 30 will be described later with reference to FIGS. 17 to 25.

Further, with regard to the continuous image generated by the free viewpoint movement display device 30 as described above, the CV value is provided for an arbitrary target video by the CV calculation means (CV video acquisition unit) 20, whereby processing as described below is enabled.

More specifically, the CV calculation means 20 calculates, based on the CV value representing 6 variables of a stationary image contained in any frame image of a target continuous image, the three-dimensional coordinates of an arbitrary point in the continuous image from the CV value of the image in the vicinity of the point, measures a distance between arbitrary two points, measures an area of an arbitrary shape, measures a volume of the arbitrary shape, disposes predetermined tag information in an arbitrary position, and recognizes an arbitrary target or determines a coordinate of the target, whereby the information can be embedded in an arbitrary place. Then, respective pieces of the information described above can be shared among all the image frames which form the continuous image.

The above functions are substantial according to the CV calculation means (CV video acquisition unit) 20, but the means 20 is combined with the free viewpoint movement display device 30, whereby the means 20 can be performed as an additional and complementary function which is associated with the viewpoint movement display processing of the target video.

[Free Viewpoint Movement Display Processing]

Next, a detail of free viewpoint movement display processing in the free viewpoint movement display device 30 described above will be described with reference to FIGS. 17 to 25.

First, as an image (target video) to be previously arranged and prepared, as described above, a full circumference video or a wide-angle video is desirably used (see FIGS. 2 to 4). The reason is that, even if the viewpoint direction is arbitrarily changed in the target video, a display image is prevented from protruding from a whole image.

Further, an original image may be a great number of still images, but is desirably a video image.

Then, the target video arranged is provided with the CV value at a time point of acquiring each image, namely, 6 variables (xyzypr) of the camera position and posture on each image frame contained in the target video by the CV video acquisition unit (CV calculation means) 20 (see FIGS. 5 to 13).

Here, the 6 variables can be acquired as the CV value by executing the CV calculation by the CV video acquisition unit (CV calculation means) 20, but as described above, can also be acquired by a mechanical sensor such as Gyro, IMU and GPS, for example.

Thus, in order to execute the viewpoint movement display on the premise of the CV video obtained by providing the arbitrary target video with the CV value, the image frames of the images or the video images having the CV values are first disposed in the virtual three-dimensional space according to the coordinate and the posture thereof (virtual three-dimensional space disposition means according to the invention). In addition, this term "virtual space" is used for description and understanding of the invention, and in order to perform practical free viewpoint movement display processing, this space is not necessarily formed.

Next, a position and a posture of a starting point are determined for a point or target specified and selected in a video in a stage of display, and simultaneously a path point on the way of viewpoint movement is specified (viewpoint movement path selection means according to the invention).

In addition, the path point on the way of viewpoint movement may be automatically determined after the starting point and an ending point for a specified point and target are specified and determined.

Further, the path on the way is not necessarily the shortest between the starting point and the ending point, and it is preferable to specify a viewpoint path so as to cross over the CV values of an already existing image because of leading to smooth viewpoint movement.

Next, the ending point of the viewpoint movement is specified (viewpoint movement path selection means according to the invention).

Specifically, a route from the starting point toward the ending point as described above is automatically or manually determined.

Further, a view angle, a direction and a moving speed of each image frame in a progress point are arbitrarily set or automatically and suitably selected (image combination parameter setting means according to the invention).

Here, it is effective to set only a viewpoint of the ending point in detail.

Then, according to conditions selected as described above, the image is displayed in a free viewpoint to reach a final point, whereby the final point can be displayed (continuous image generation means according to the invention).

Hereinafter, processing operation of the above-described viewpoint movement display will be described by taking a specific target video (CV video) as an example with reference to FIGS. 17 to 25.

Figure 17:
Figure 17:
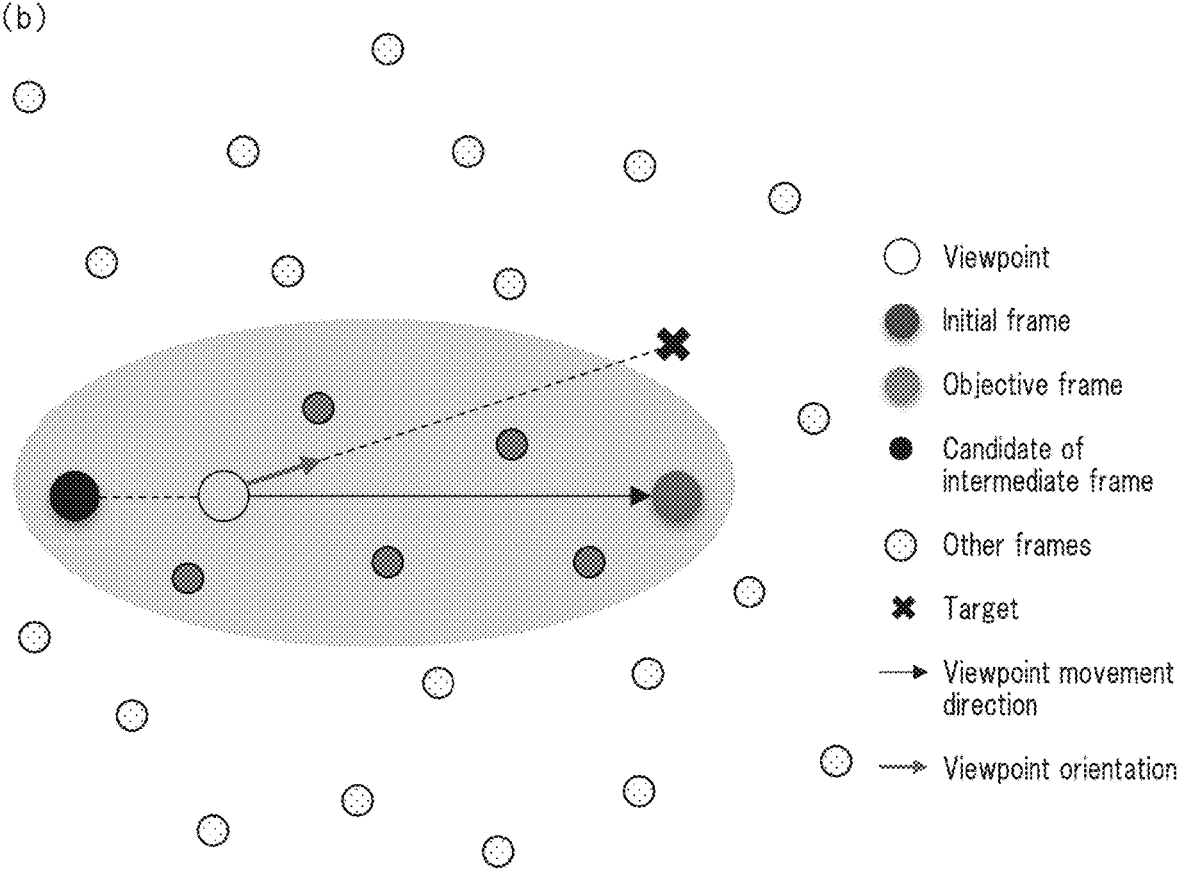

FIGS. 17 to 20 are an explanatory diagram schematically showing a relationship between a target video and a CV value of the target video in the free viewpoint movement display device 30 according to the present embodiment, in which FIGS. 17(*a*) to 20(*a*) show one example of the target video, and FIGS. 17(*b*) to 20(*b*) show a CV value corresponding to the target video shown in FIGS. 17(*a*) to 20(*a*).

The target videos shown in the above drawings are provided, as assumptions, with the CV values by the CV video acquisition unit (CV calculation means) 20 on the premise that a CV video capable of three-dimensional measurement is used.

[Frame Movement Animation]

First, an algorithm of frame movement animation (viewpoint movement display of a continuous image) will be explained.

A target video is displayed on a display of a computer such as PC of a user, and an arbitrary point or target in the target video is selected and specified according input operation of the user (for example, an input device such as a mouse, touch operation or the like) (see FIG. 17(*a*)).

If a target displayed in the target video is specified, a three-dimensional position thereof is determined.

If the three-dimensional position of the target is determined, as shown in FIG. 17(*b*), a viewpoint on the target linearly moves from an initial frame toward an objective frame.

At this time, the objective frame is taken as a frame geographically closest to the target.

Then, in order to view a process of moving the viewpoint smooth, the viewpoint is moved, while intermediate frame images existing in the vicinity of the viewpoint are blended, to direct the viewpoint toward the target at all times.

Further, at this time, as many images as possible are adopted within a predetermined period of time without adopting all the intermediate frame images.

Further, the viewpoint linearly moves, and therefore a position of the viewpoint and an original position of a frame are not matched.

Accordingly, an apparent size of the target is discontinuously changed when the images are switched merely by allowing the frame images to continuously display thereon.

In order to avoid such inconvenience, a view angle is adjusted so that the apparent size of the target may be smoothly changed according to a distance to the target.

Figure 18:
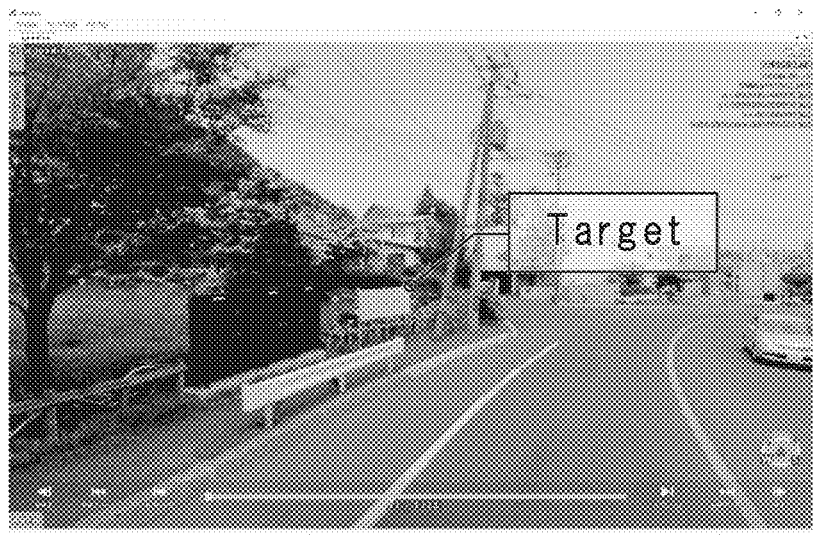
FIGS. 18(a) and 18(b) are explanatory diagrams schematically showing a relationship between a target video and CV values of the target video, continuing from FIG. 17.
Figure 18:
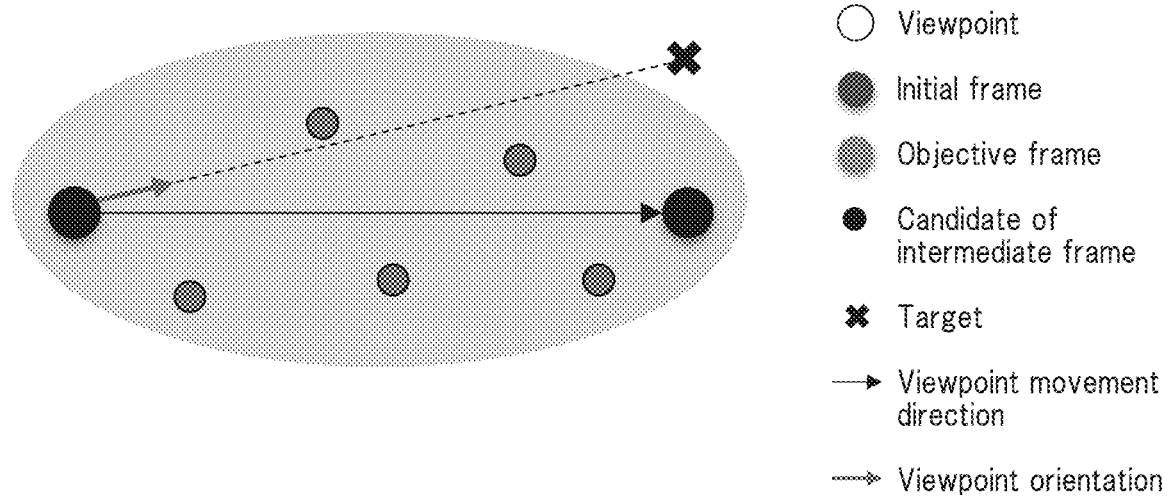
Figure 19:
FIGS. 19(a) and 19(b) are explanatory diagrams schematically showing a relationship between a target video and CV values of the target video, continuing from FIG. 18.
Figure 19:
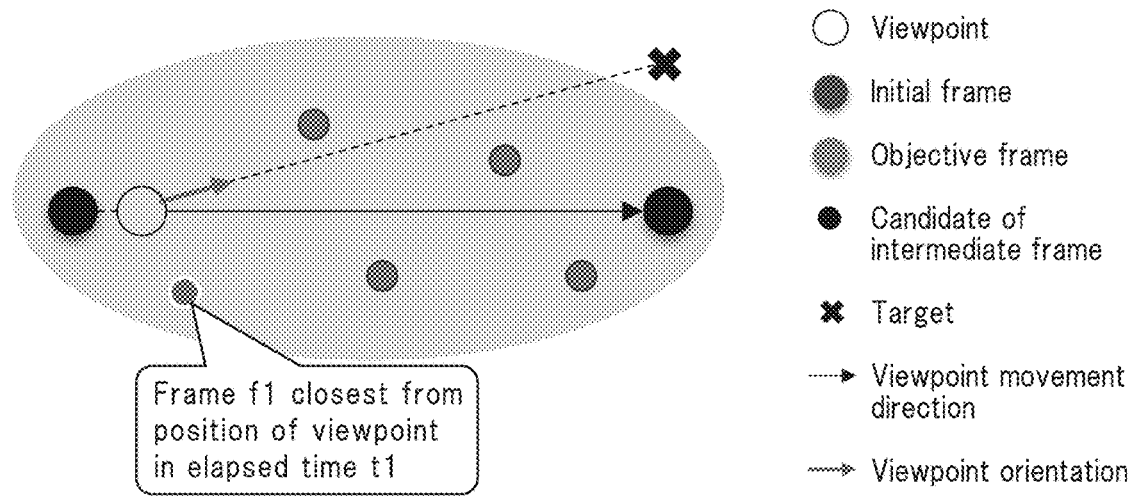
Figure 20:
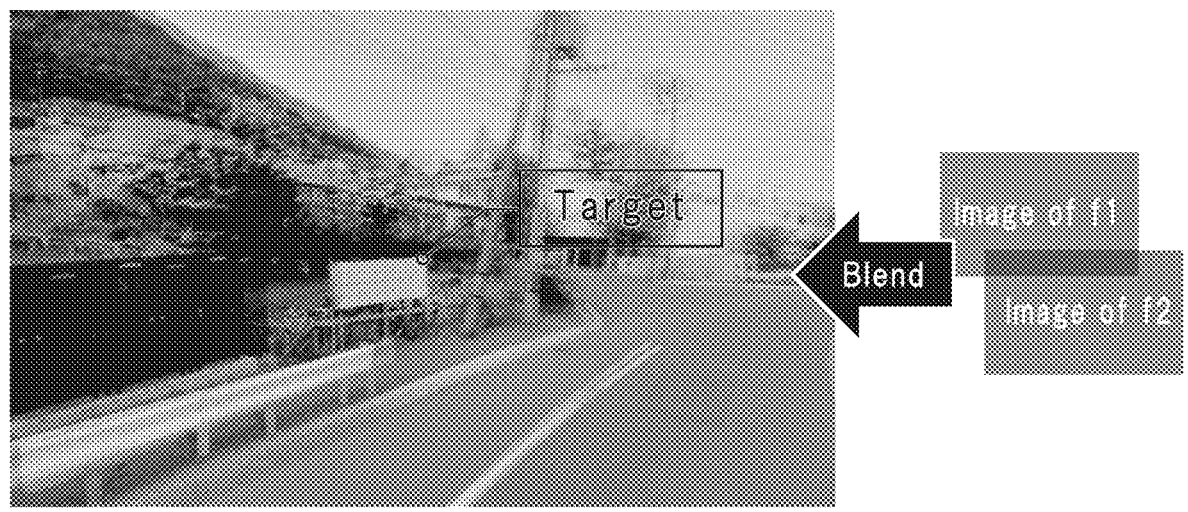
FIGS. 20(a) and 20(b) are explanatory diagrams schematically showing a relationship between a target video and CV values of the target video, continuing from FIG. 19.
Figure 20:
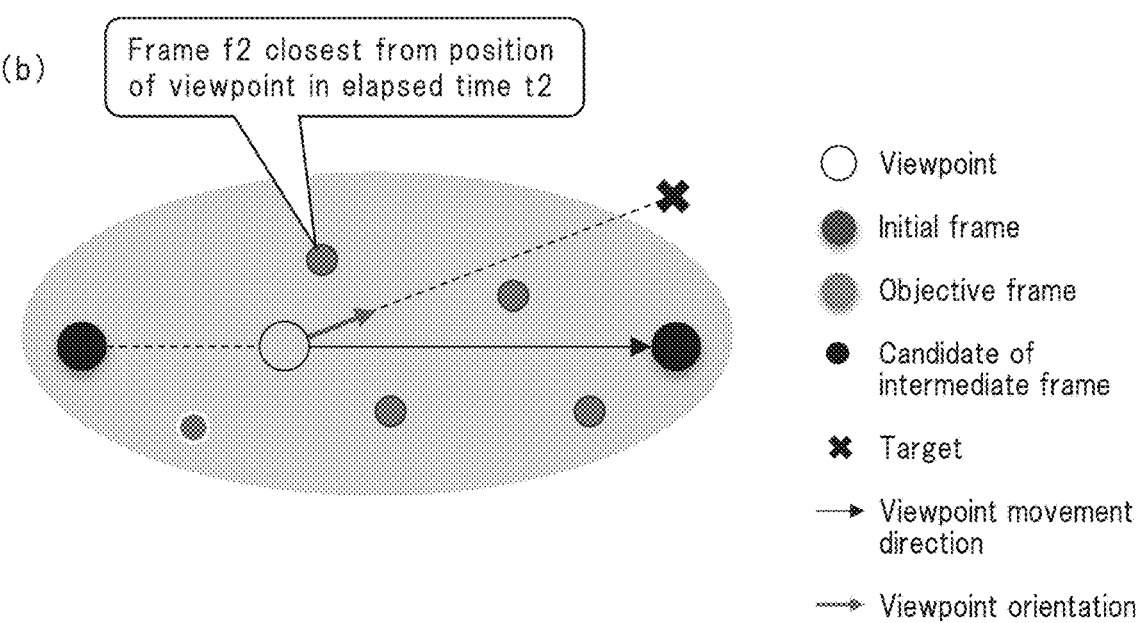

FIGS. 18 to 20 show a case where a "bulletin board for election posters" existing on a left side ahead along a road in the target video is selected and specified.

In this case, first, a position of the viewpoint is equal to a position of an initial frame f0 in "elapsed time 0" shown in FIG. 18 in selection of an intermediate frame (see FIG. 18(*b*)).

At this time, an image of f0 centering the target is displayed on a window (display of PC, or the like) (see FIG. 18(a)).

From this state, the viewpoint starts movement toward the objective frame to change the view angle so that the target may be zoomed. The view angle changes depending on the position of the viewpoint.

Specifically, in "elapsed time t1" shown in FIG. 19, a frame closest to the position of the viewpoint changes (moves) from f0 to an intermediate frame f1.

Here, acquisition processing of an image of f1 (see FIG. 19(a)) is started. The movement of the viewpoint and the zoom are continuously performed even during the acquisition processing of the image.

If the acquisition processing of the image of f1 is completed, an image of f0 and f1 blended centering the target is displayed on the window. At this time, the view angle of the images of f0 and f1 is determined according to the position of the viewpoint.

Subsequently, in "elapsed time t2" shown in FIG. 20, the intermediate frame closest to the position of the viewpoint is changed from f1 to f2.

Here, acquisition processing of an image of f2 is started.

However, when the acquisition processing of the image of f1 is not completed, the acquisition processing of the image of f2 is not performed, and only the movement of the viewpoint and the zoom are continued until the acquisition processing is completed.

When the acquisition processing of the image of f2 is completed, an image of f1 and f2 blended centering the target is displayed on the window. At this time, the view angle of the images of f1 and f2 is determined according to the position of the viewpoint.

Hereinafter, a series of the processing described above is repeatedly executed until the objective frame reaches an objective frame fn.

Thus, while the closest image is selected and sequentially displayed from a plurality of image data disposed in the three-dimensional space, the images are combined while enlargement and reduction of the image and the viewpoint direction movement are performed, whereby smooth and continuous viewpoint movement without distortion is performed.

[View Angle Adjustment]

Figure 21:
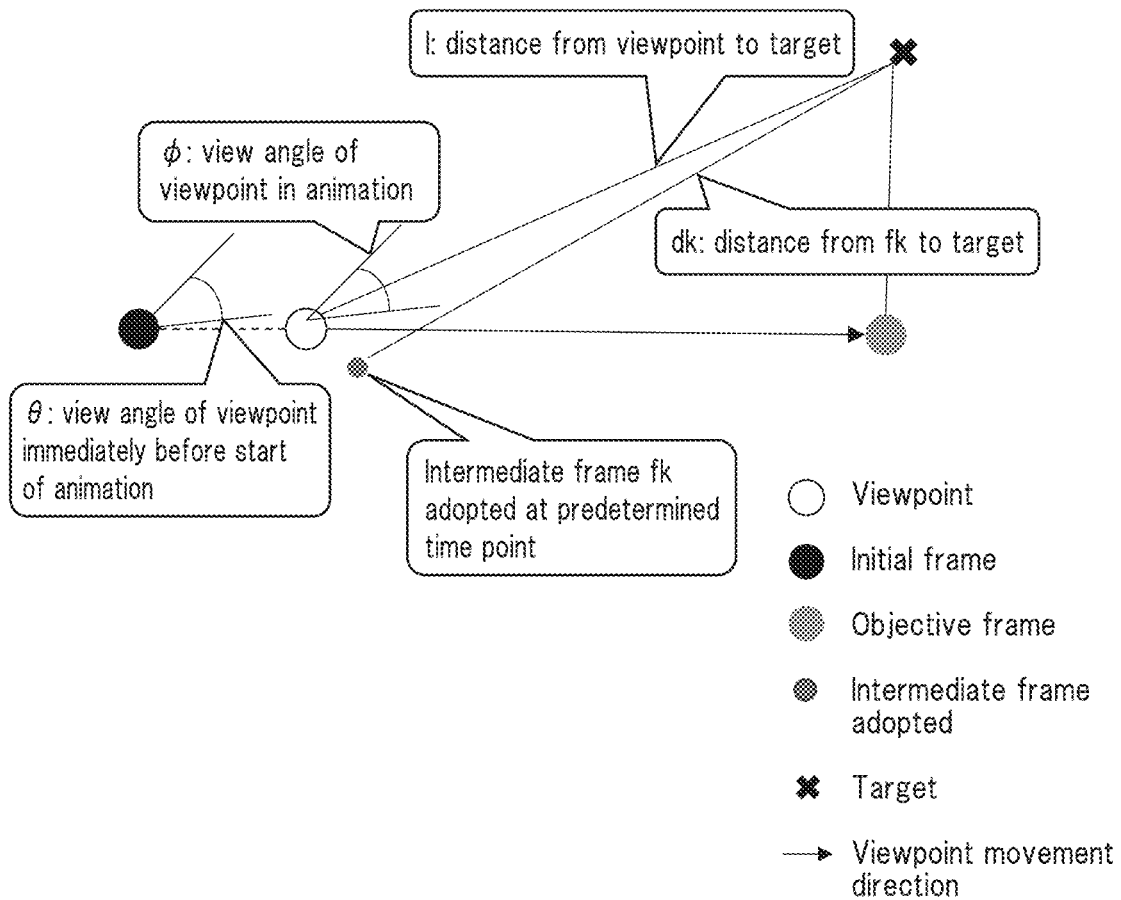
FIG. 21 is an explanatory diagram describing operation of adjustment processing of a view angle based on CV values in a free viewpoint movement display device according to one embodiment of the invention.

FIG. 21 is an explanatory diagram describing operation of view angle adjustment processing based on a CV value in the free viewpoint movement display device 30 according to the present embodiment.

In the view angle adjustment, the view angle is adjusted so that a size of the target may be viewed to be gradually larger accordingly as the viewpoint approaches the target.

Figure 22:
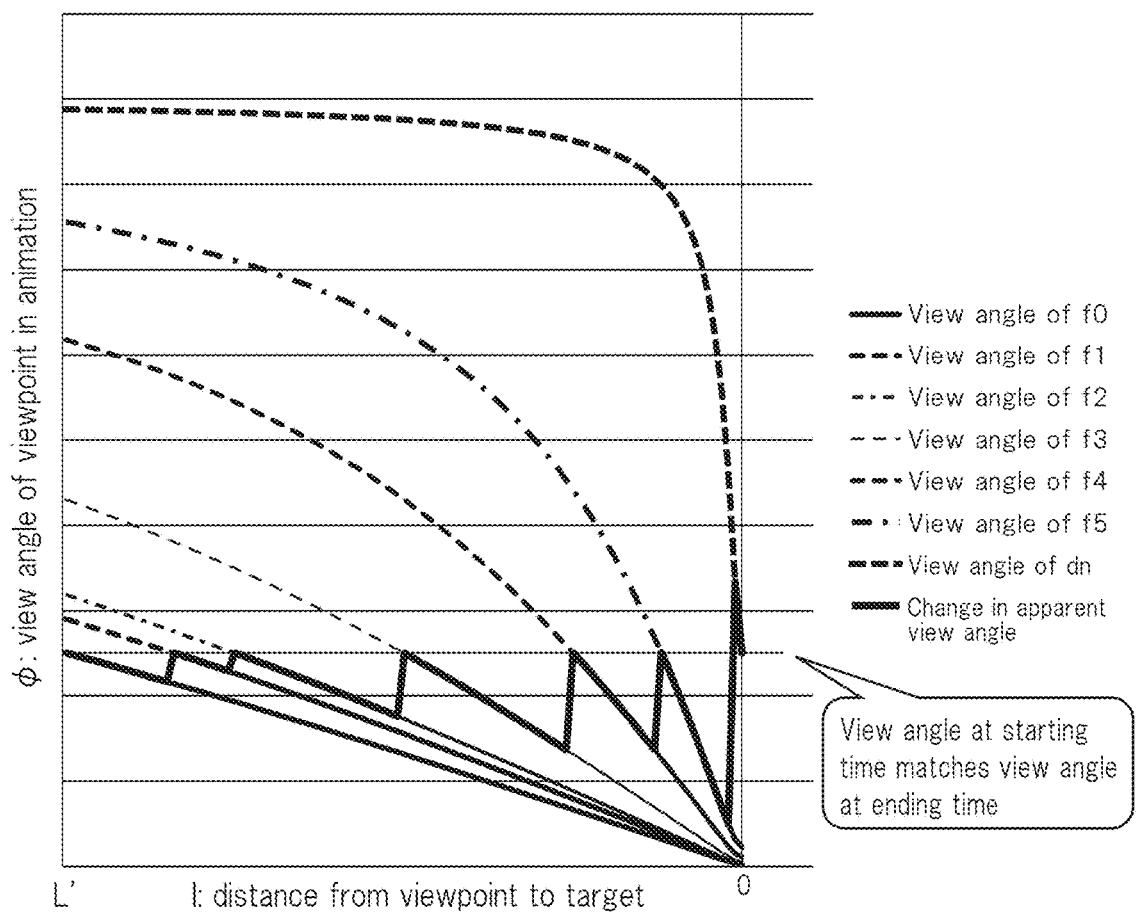
FIG. 22 is an explanatory diagram describing a relationship between a viewpoint position and a view angle based on CV values in a free viewpoint movement display device according to one embodiment of the invention.

As shown in FIG. 22, a view angle φ of a viewpoint in animation in which the viewpoint movement is performed in a continuous image is different depending on an adopted intermediate frame image and determined according to the formula 1 described below.

$$\varphi = \arctan(\tan(\theta/2) \times l/dk) \times 2 \qquad \text{[Formula 1]}$$

l: distance from viewpoint to target
dk: distance from fk to target
θ: view angle of viewpoint immediately before start of animation
φ: view angle of viewpoint in animation As shown in the above-described formula 1, when the viewpoint reaches the objective frame, an equation: l=dk holds, and therefore a final view angle φ becomes equal to a view angle θ immediately before start of the animation.

FIG. 22 is an explanatory diagram describing a relationship between a viewpoint position and a view angle based on the CV value shown in FIG. 21.

In FIG. 22, the symbol "L" represents a distance from an initial frame to a target.

The relationship between the viewpoint position and the view angle in the animation is as shown in FIG. 22, in which it is found that, when the viewpoint reaches the objective frame, the final view angle φ becomes equal to the view angle θ immediately before start of the animation.

[Intermediate Frame Image Blend]

Figure 23:
Figure 23:
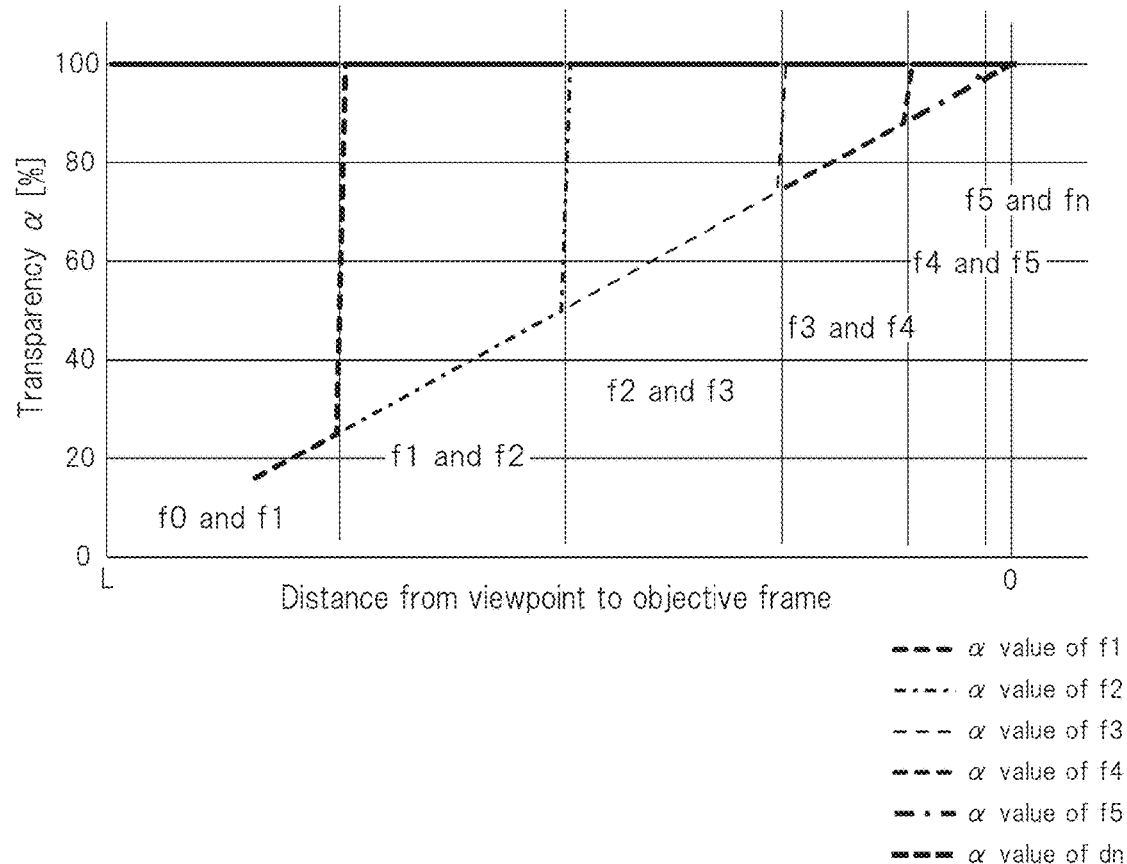

FIG. 23 is an explanatory diagram describing operation of blending processing of intermediate frame images based on a CV value in the free viewpoint movement display device 30 according to the present embodiment, in which FIG. 23(a) shows one example of a target video subjected to the blending processing, and FIG. 23(b) is a graph showing a relationship between a blend ratio of two intermediate frame images subjected to the blending processing as shown in FIG. 23(a) and a distance from a viewpoint to an objective frame.

FIG. 23(a) shows a display example of results of blending two newest intermediate frame images on a screen.

As shown in FIG. 23(a), an older intermediate frame image (fk−1) is formed at transparency of 0% (completely opaque state), and a newer intermediate frame image (fk) is overlaid thereon at transparency of a % (for example, 16 to 25% or the like).

Two images to be blended have the target on a center, and therefore as shown in FIG. 23(a), a blur between the images becomes larger in a place farther from the center.

A relationship between the blend ratio of the two intermediate frame images to be adopted and the distance from the viewpoint to the objective frame is as shown in FIG. 23(b).

[Elapsed Time and Distance to Objective Frame]

Figure 24:
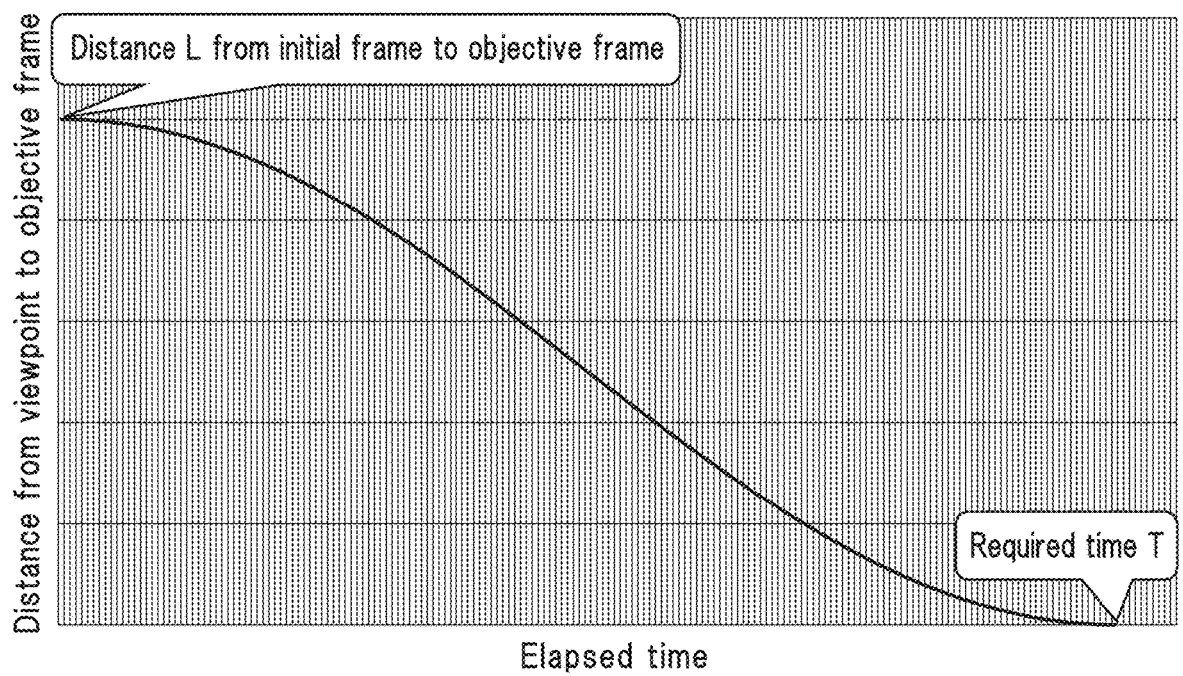
FIG. 24 is a graph showing a relationship between an elapsed time of animation by a plurality of frame images and a distance from a viewpoint to an objective frame in a free viewpoint movement display device according to one embodiment of the invention.

FIG. 24 is a graph showing a relationship between an elapsed time of animation by a plurality of frame images and a distance from a viewpoint to an objective frame in the free viewpoint movement display device 30 according to the present embodiment.

As shown in FIG. 24, a required time T of the animation can be adjusted so as to be proportional to a distance L from an initial frame to the objective frame.

The relationship between the "elapsed time" and the "distance from the viewpoint to a final frame" is preferably adjusted to be a cosine curve.

This relationship can be set and adjusted by moving the viewpoint at a low speed immediately after starting and immediately before ending, in which the number of times of switching the images is increased, whereby videos can be smoothly changed.

[Change in View Angle]

FIG. 25 is an explanatory diagram showing one example of a change in a view angle of each intermediate frame image acquired in animation by a plurality of frame images in the free viewpoint movement display device 30 according to the present embodiment.

In each intermediate frame image acquired in the animation, as shown in FIG. 25, an apparent view angle changes.

Thus, motion of the continuous image to be displayed can be smoothened.

As described above, the viewpoint movement in the free viewpoint movement display device 30 according to the present embodiment is displayed as the video image or the continuous still image, and in this case, accordingly as the number of images reproduced on the way is larger, namely, accordingly as a density of the frames is increased, the motion is smoothened.

Such smoothening is just similar to smoother reproduction, if the number of stop motion images is larger. Accordingly, an intermediate frame can also be added only when the image is displayed as the video image so that the motion may look smooth.

The intermediate frame is generated, although the image frames on both adjacent sides are referenced, by changing only the enlargement ratio and the direction from any one of the images to have no distortion as the image, and therefore no distortion is generated even if the image is viewed as the still image.

However, if an emphasis is placed on video reproduction to generate the intermediate frame by blending the images on both ends, the intermediate frames are overlapped and displayed as the image, and therefore when viewed in the video, the intermediate frame looks smooth. However, the intermediate frames are overlapped and reproduced when viewed as the still images, and therefore becomes non-smooth, and such operation is effective only during the video reproduction.

As described above, according to the free viewpoint movement display device 30 of the present embodiment, the plurality of image data are disposed, without using the CG at all, in the virtual space, to sequentially display the images, while selecting the closest image according to viewpoint movement, whereby the viewpoint can be moved while combining, without using the CG, the intermediates by enlargement and reduction of the image and the viewpoint direction movement.

Accordingly, the continuous viewpoint movement without distortion unique to the CG can be achieved, and the video of smooth viewpoint movement can be reproduced, and also even if the video is stopped at any position of the image to be displayed as the still image, the still image without distortion can be displayed without causing omission of information as in the CG.

EXAMPLES

Next, more specific Example of a free viewpoint movement display device according to the present embodiment will be described.

Example 1

A video image was acquired on an entrance and an inside of a building so as to draw a plurality of loci on a plane surface. The loci were disposed and recorded in a virtual three-dimensional space.

A video at an A point was stopped and displayed as a still image, and if an X point near a hospital building was clicked, as the video, the A point was displayed, and then while a B point, a C point and a D point were displayed, the video finally reached the X point.

In the present Example, while gradually zooming the video, an enlarged target place was able to be finally displayed.

If a departure point was changed to an E point, while the E point and a G point were displayed and passed therethrough, the video finally reached a Y point.

In this Example, no video in the sky was available because of terrestrial pick-up. However, if a CV video in the sky is acquired by using a UAV or the like, it is obvious that a viewpoint can be freely changed in a three-dimensional space.

Example 2

A target video was picked up by using a drone while moving the drone in a three-dimensional space.

Specifically, an aerial video of a target area was three-dimensionally picked up from all angles and different heights. Each frame image of the aerial video picked up by using the drone acquired a CV value by using a mechanical sensor and a CV calculation simultaneously with pick-up. Then, images (CV images) acquiring the CV values were disposed in a virtual space.

A starting point and an ending point were selected from among a group of the images having the CV values or a group of video images having the CV values to automatically select the images according to a scheduled movement path of a viewpoint.

A suitable image close to the scheduled movement path of the viewpoint was selected to specify a locus, and an attribute of an image display was specified or automatically selected.

While the image on the way was selected in a free viewpoint, a parameter to allow viewpoint movement toward the ending point was selected.

In order to lessen discontinuity originally derived from the still image in which the images are continuous, it is desirable to smoothly combine adjacent inter-images to move the images.

Accordingly, in the present Example, adjacent image frames were overlaid with each other to generate an intermediate image. Further, at this time, an enlargement ratio of adjacent images was adjusted in such a manner that an object serving as the target was most continuously changed. Thus, the image was able to be displayed while the viewpoints were continuously and freely changed from the starting point to the ending point.

In addition, in the present Example, a plurality of take-up loci are generated in the three-dimensional space, and the image by the terrestrial pick-up is also one of the loci. Then, picked-up images by terrestrial pick-up and aerial pick-up were integrated based on the CV values, and were able to be generated and displayed as the continuous image according to the invention.

As described above, the free viewpoint movement display device of the invention was described by showing preferred embodiments and Examples, but the free viewpoint movement display device according to the invention is not limited only to the embodiments or the Examples as described above, and various modifications can be obviously made within the scope of the invention.

In the embodiment described above, viewpoint movement display in the free viewpoint movement display device 30 is described as a device to be viewed by a human such as the user.

However, the viewpoint movement display according to the invention can also be applied as a 3D map viewed by a machine.

More specifically, in the free viewpoint movement display device according to the invention, the CG is not used, and therefore the device has no omission of information into accurate information as the image. Accordingly, the viewpoint movement display generated and displayed by the free viewpoint movement display device according to the invention is used as the 3D map, whereby the free viewpoint movement display device can be utilized as a self-position posture orientation device (self-position posture orientation means in claim 4 of the present application).

The self-position posture orientation device is an invention previously filed by an applicant of the present application (Japanese Patent Application No. 2016-223563), in which, in automatic operation of various vehicles, aircraft, ships or the like, automatic travelling of a robot or the like, self-position posture orientation for orientating a self-position and posture in real time in moving vehicles and the like can be determined simply and at low cost, high speed and with high precision by use as the reference video map formed of the CV videos.

[Application to Self-Position Posture Orientation Device]

Viewpoint movement display processing by the free viewpoint movement display device according to the invention is combined with such a self-position posture orientation device, whereby various viewpoint directions, various view angles and various enlargement ratios can be utilized in a reference video map serving as a reference of the self-position posture orientation, thereby significantly facilitating conformity with a live video.

Accordingly, the self-position posture orientation device with higher precision can be realized.

In particular, in the self-position posture orientation for the aircraft or the drone, the view angle and the viewpoint direction close to the camera mounted on a flight vehicle can be selected, and therefore precision of the self-position posture orientation device is improved.

Figure 26:
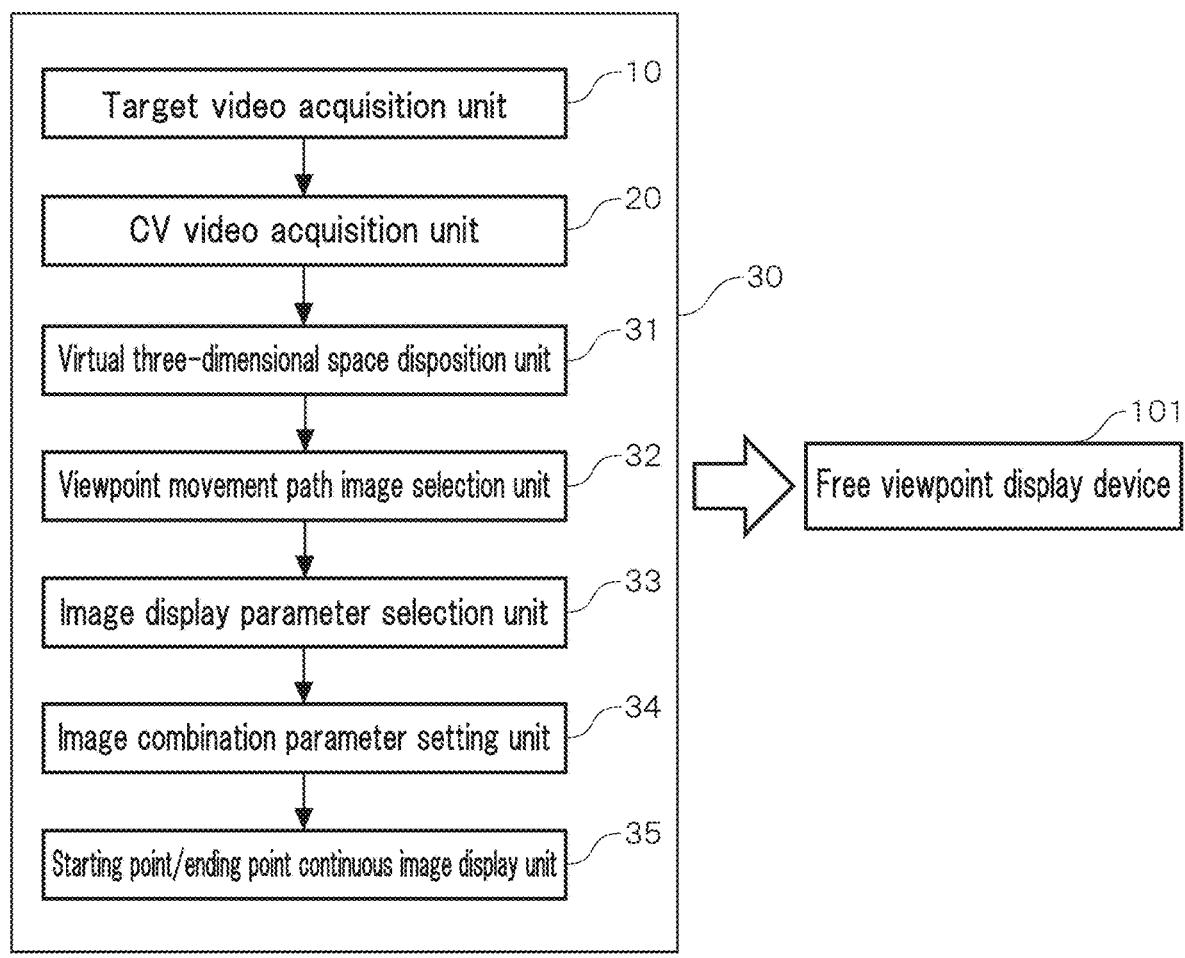
FIG. 26 is a function block diagram showing a free viewpoint movement display device according to one embodiment of the invention applied to a self-position posture orientation device.
Figure 27:
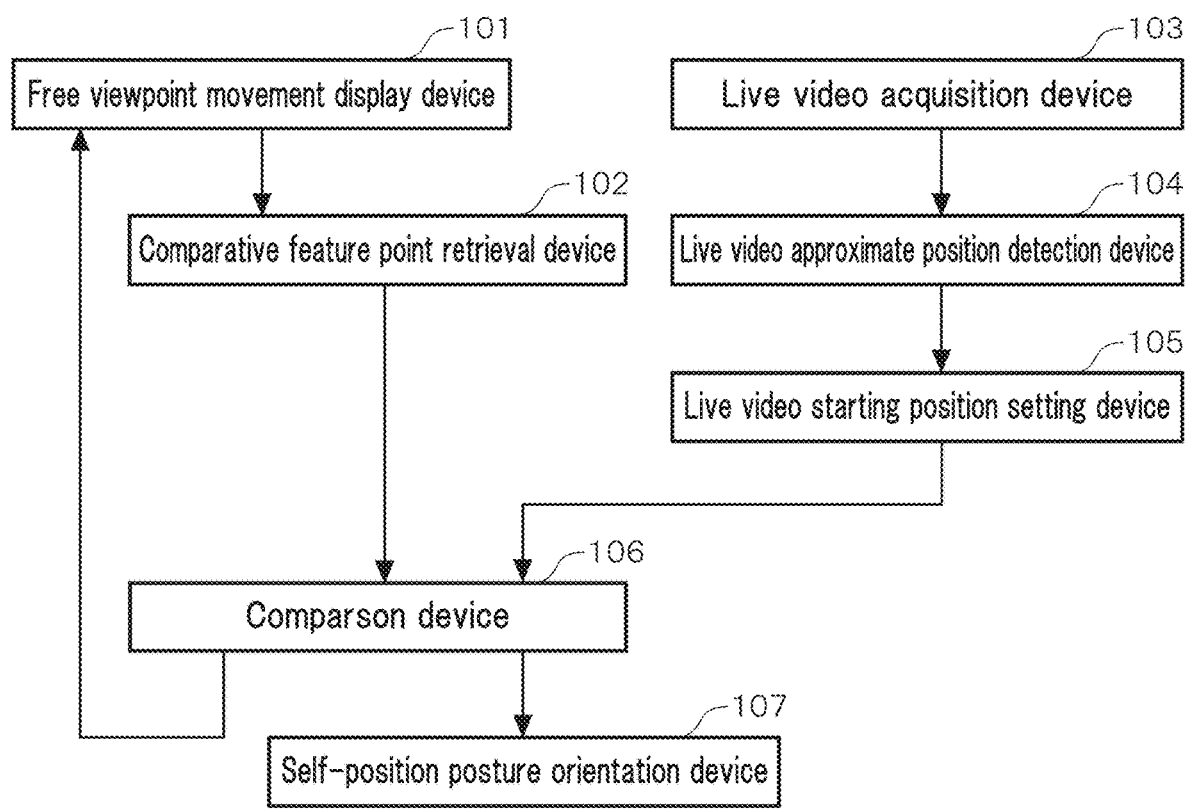
FIG. 27 is a function block diagram showing one embodiment of a self-position posture orientation device having a free viewpoint movement display device according to one embodiment of the invention.

FIGS. 26 and 27 show a function composition block diagram when a free viewpoint movement display device according to the invention is applied to a self-position posture orientation device.

As shown in FIGS. 26 and 27, the self-position posture orientation device according to the invention has the free viewpoint movement display device 30 including, as described above, the target video acquisition unit 10 and the CV video acquisition unit 20 as a free viewpoint display device 101 (see FIG. 26), and an image provided with a CV value by the CV video acquisition means (CV video acquisition unit 20) according to the invention is applied as a reference image, and the reference image in which the viewpoint can be moved is used.

Specifically, the free viewpoint movement display device (101) capable of free viewpoint movement is used as the 3D map serving as the reference image.

Meanwhile, an image having no CV value acquired by a vehicle-mounted camera or the like, serving as a target to be orientated, is acquired by a live video acquisition device 103.

The live video acquired by the live video acquisition device 103 is compared by a comparative feature point retrieval device 102 and a comparison device 106 through approximate position detection by a live video approximate position detection device 104 and initial position setting by a live video starting position detection device 105.

Here, the reference image to be utilized as the 3D map is not necessarily a well-established whole image. The reference image is deleted, and then an image consisting of a plurality of feature points and feature objects in the reference image can be applied as a new reference image. It is advantageous to calculate the three-dimensional coordinates of the feature points and the feature objects.

In the comparison device 106, the plurality of feature points and feature objects are automatically selected, compared and input into a self-position posture orientation device 107.

In the self-position posture orientation device 107, correspondence of the plurality of feature points and feature objects in both the 3D map serving as the reference video and the live video serving as an orientation target is taken, but if the feature points and the sizes of the feature objects on the screen are significantly different from each other, effective comparison thereof cannot be achieved.

Then, in order to meet approximate sizes of both, an image having the same degree of magnification as a comparative video and a small image region including the feature points are automatically selected by the automatic viewpoint movement device 101, whereby both can be compared in a state of approximately meeting the viewpoint direction, the enlargement ratio and the like.

Thus, according to the self-position posture orientation device 107 having the free viewpoint movement display device 101, both the images can be compared in a state of meeting the viewpoint and the size of the image, and the like as much as possible, whereby self-position posture orientation is enabled with satisfactory precision and efficiently.

More specifically, when the plurality of feature points and feature objects are automatically selected, the reference image can be compared with the image by selecting the image having magnification as close as possible to the comparative image (image having no CV value) by the free viewpoint movement display device 101. Both the images are compared at magnification close to each other, whereby a comparative function is suitably operated in the comparison device 106, and self-position posture orientation with high precision is achieved by the self-position posture orientation device 107.

Thus, in comparison with a case where the reference image having no free viewpoint movement display device is applied as the 3D map, the CV value is provided for the image having no CV value by corresponding the same point or region thereto efficiently and with high precision, whereby a self-position posture of the image can be determined.

INDUSTRIAL APPLICABILITY

The invention can be preferably utilized, based on an image and a video acquired by a video camera or the like, as an image and video processing technology for representing and displaying the image or the video in a free viewpoint.

Further, according to a free viewpoint movement display device of the invention, an optimum image is automatically selected, and the selected image is used as a 3D map, whereby a coordinate and a posture can be provided for the image having no coordinate in which a view angle and an enlargement ratio of the image are indefinite.

Further, the free viewpoint movement display device of the invention can be preferably utilized as an image processing technology for providing an arbitrary image having a different view angle and a different enlargement ratio with the coordinate and the posture in a great number of industrial fields. Accordingly, for example, the self-position posture orientation described above is enabled even from a digital camera or smartphone image or the like picked by an ordinary person, in which various view angles may be present.

The entire contents of the documents described in this description and the description of the Japanese application serving as a basis of claiming the priority concerning the present application to the Paris Convention are incorporated by reference herein.

EXPLANATION OF NUMERICAL SYMBOLS

10 Target video acquisition unit
20 CV video acquisition unit (CV calculation means)
30 Free viewpoint movement display device
31 Virtual three-dimensional space disposition unit
32 Viewpoint movement path image selection unit
33 Image display parameter selection unit
34 Image combination parameter setting unit
35 Starting point/ending point continuous image display unit

The invention claimed is:

1. A free viewpoint movement display device, comprising:
a camera vector (CV) video acquisition means which generates a CV video obtained by adding a CV value to a target video on which a CV calculation is performed to obtain the CV value representing three-dimensional coordinate values indicating a camera position and posture of the target video picked up by a predetermined video acquisition means;
a virtual three-dimensional space disposition means which disposes, in a virtual space which is formed of a database and data processing in practice, a plurality of CV videos obtained by adding the CV values representing the three-dimensional coordinate values of the camera position and posture, in accordance with the three-dimensional coordinates;
a viewpoint movement path selection means which selects, from among the plurality of CV videos, a plurality of image frames closest to scheduled viewpoint movement coordinates in a suitable interval according to the scheduled viewpoint movement coordinates; and
a continuous image generation means which converts a viewpoint direction, an enlargement ratio, a view angle and a viewpoint movement direction of the plurality of image frames selected so as to match a scheduled direction, and sequentially combines the image frames selected to generate a continuous image formed of a video image or a continuous still image, wherein
an image of visually smooth viewpoint movement and smooth viewpoint direction movement is displayed by using the continuous image,
the viewpoint movement path selection means specifies coordinates of a starting point and an ending point of the plurality of image frames, and a progress point of the starting point and the ending point,
the continuous image generation means comprises:
an image combination parameter setting means that sets, as a combination parameter used for combining the plurality of image frames, at least any one of a size of each image, an enlargement ratio of a zoom, a view angle, a coordinate of a viewpoint and a posture thereof for the plurality of image frames; and
a starting point/ending point continuous image display means which generates, based on setting of the combination parameter, a moving locus in a three-dimensional space, including the starting point and the ending point of the plurality of image frames, and the progress point thereof, and each image is displayed in matching a change in a size of an important target in a plurality of continuous images, whereby a plurality of inter-images selected are continuously displayed.

2. The free viewpoint movement display device according to claim 1, wherein,
the CV video acquisition means, based on the CV value representing 6 variables of a stationary image contained in the continuous image,
calculates three-dimensional coordinates of an arbitrary point in the continuous image from a CV value of an image in the vicinity of the point, measures a distance between arbitrary two points, measures an area of an arbitrary shape, measures a volume of the arbitrary shape, disposes predetermined tag information in an arbitrary position, recognizes an arbitrary target or determines a coordinate of the target, and embeds information in an arbitrary place, whereby respective pieces of the information are simultaneously or individually shared among all image frames which form the continuous image.

3. A free viewpoint movement display device comprising:
a camera vector (CV) video acquisition means which generates a CV video obtained by adding a CV value to a target video on which a CV calculation is performed to obtain the CV value representing three-dimensional coordinate values indicating a camera position and posture of the target video picked up by a predetermined video acquisition means;
a virtual three-dimensional space disposition means which disposes, in a virtual space which is formed of a database and data processing in practice, a plurality of CV videos obtained by adding the CV values representing the three-dimensional coordinate values of the camera position and posture, in accordance with the three-dimensional coordinates;
a viewpoint movement path selection means which selects, from among the plurality of CV videos, a plurality of image frames closest to scheduled viewpoint movement coordinates in a suitable interval according to the scheduled viewpoint movement coordinates;
a continuous image generation means which converts a viewpoint direction, an enlargement ratio, a view angle and a viewpoint movement direction of the plurality of image frames selected so as to match a scheduled direction, and sequentially combines the image frames selected to generate a continuous image formed of a video image or a continuous still image; and
a self-position posture orientation means, wherein
an image of visually smooth viewpoint movement and smooth viewpoint direction movement is displayed by using the continuous image, and
an image provided with the CV value is applied as a reference image, and the reference image is compared with an image having no CV value, whereby
a plurality of feature points and feature objects in the reference image are automatically selected, or
the reference image is deleted, and then an image consisting of the plurality of feature points and feature objects in the reference image is automatically selected, and
a common point or region is corresponded to the image having no CV value to give the CV value thereto to determine a self-position posture of the image.

4. A free viewpoint movement display device comprising:
- a camera vector (CV) video acquisition means which generates a CV video obtained by adding a CV value to a target video on which a CV calculation is performed to obtain the CV value representing three-dimensional coordinate values indicating a camera position and posture of the target video picked up by a predetermined video acquisition means;
- a virtual three-dimensional space disposition means which disposes, in a virtual space which is formed of a database and data processing in practice, a plurality of CV videos obtained by adding the CV values representing the three-dimensional coordinate values of the camera position and posture, in accordance with the three-dimensional coordinates;
- a viewpoint movement path selection means which selects, from among the plurality of CV videos, a plurality of image frames closest to scheduled viewpoint movement coordinates in a suitable interval according to the scheduled viewpoint movement coordinates; and
- a continuous image generation means which converts a viewpoint direction, an enlargement ratio, a view angle and a viewpoint movement direction of the plurality of image frames selected so as to match a scheduled direction, and sequentially combines the image frames selected to generate a continuous image formed of a video image or a continuous still image, wherein the CV video acquisition means comprises:
- a feature point extraction unit which automatically extracts, from among image data of the target video, a predetermined number of feature points;
- a feature point correspondence processing unit which automatically tracks, in each frame image of the target video, the feature points extracted to determine a correspondence relationship among the frame images; and
- a camera vector calculation unit which determines three-dimensional position coordinates of the feature points in which the correspondence relationship is determined to determine, from the three-dimensional position coordinates, a camera vector indicating a three-dimensional camera position and posture in corresponding to each frame image, and an image of visually smooth viewpoint movement and smooth viewpoint direction movement is displayed by using the continuous image.

* * * * *